(12) United States Patent
Yamaga

(10) Patent No.: US 12,136,437 B2
(45) Date of Patent: Nov. 5, 2024

(54) SERVO PATTERN RECORDING METHOD, SERVO PATTERN RECORDING APPARATUS, METHOD OF PRODUCING TAPE-LIKE MAGNETIC RECORDING MEDIUM, TAPE-LIKE MAGNETIC RECORDING MEDIUM, AND SERVO WRITE HEAD

(71) Applicant: Sony Group Corporation, Tokyo (JP)

(72) Inventor: Minoru Yamaga, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 18/281,144

(22) PCT Filed: Feb. 28, 2022

(86) PCT No.: PCT/JP2022/008219
§ 371 (c)(1),
(2) Date: Sep. 8, 2023

(87) PCT Pub. No.: WO2022/190928
PCT Pub. Date: Sep. 15, 2022

(65) Prior Publication Data
US 2024/0153535 A1 May 9, 2024

(30) Foreign Application Priority Data

Mar. 11, 2021 (JP) .................................. 2021-039338

(51) Int. Cl.
*G11B 20/12* (2006.01)
*G11B 5/008* (2006.01)
(52) U.S. Cl.
CPC ...... *G11B 20/1202* (2013.01); *G11B 5/00817* (2013.01)
(58) Field of Classification Search
None
See application file for complete search history.

(56) References Cited

U.S. PATENT DOCUMENTS 6,674,604 B1 * 1/2004 Teng .................... G11B 5/54
6,934,115 B1 * 8/2005 Kientz ................. G11B 5/584
(Continued)

FOREIGN PATENT DOCUMENTS

| EP | 1528540 A1 | 5/2005 |
| JP | 2011523487 A | 8/2011 |
| JP | 6648855 B1 | 2/2020 |

OTHER PUBLICATIONS

International Search Report from corresponding PCT application PCT/JP2022/008219, dated May 17, 2022.

Primary Examiner — Peter Vincent Agustin
(74) Attorney, Agent, or Firm — K&L Gates LLP

(57) ABSTRACT

A servo pattern recording method includes: determining a first servo band group that includes three or more servo bands for recording a servo pattern in which first servo band identification information having a plurality of bits is to be embedded, and a second servo band group that includes three or more servo bands for recording a servo pattern in which second servo band identification information having a plurality of bits is to be embedded, the second servo band identification information being different from the first servo band identification information; and recording the first and second servo band identification information on the first and second servo band groups, respectively, such that a combination of a first pair and a second pair is not duplicated, the first pair being a pair of servo band identification information and a phase in one servo band read by a first servo read head, the second pair being a pair of servo band identification information and a phase in the other servo band read by a second servo read head.

24 Claims, 19 Drawing Sheets

(56) References Cited

U.S. PATENT DOCUMENTS

| | | | |
|---|---|---|---|
| 2004/0032685 A1* | 2/2004 | Trabert | G11B 5/584 |
| 2004/0174132 A1 | 9/2004 | Johnson et al. | |
| 2005/0099713 A1* | 5/2005 | Molstad | G11B 5/584 |
| 2006/0126207 A1* | 6/2006 | Johnson | G11B 5/584 |
| 2008/0049356 A1* | 2/2008 | Weber | G11B 5/584 |
| 2009/0279202 A1 | 11/2009 | Cherubini et al. | |
| 2015/0092295 A1* | 4/2015 | Cherubini | G11B 5/00826 |
| | | | 360/63 |
| 2019/0348067 A1 | 11/2019 | Goker et al. | |
| 2021/0056986 A1* | 2/2021 | Yamaga | G11B 5/00817 |
| 2024/0153535 A1* | 5/2024 | Yamaga | G11B 5/00817 |

* cited by examiner

SERVO PATTERN RECORDING METHOD, SERVO PATTERN RECORDING APPARATUS, METHOD OF PRODUCING TAPE-LIKE MAGNETIC RECORDING MEDIUM, TAPE-LIKE MAGNETIC RECORDING MEDIUM, AND SERVO WRITE HEAD

TECHNICAL FIELD

The present technology relates to a servo pattern recording method for writing a servo pattern in a magnetic layer, a servo pattern recording apparatus, a tape-like magnetic recording medium including a magnetic layer in which a servo pattern is recorded, a method of producing the same, and a servo write head.

BACKGROUND ART

In recent years, a magnetic recording medium has been widely used for backing up electronic data, and the like. As one magnetic recording medium, for example, a magnetic tape cartridge has a large capacity and can be preserved for a long time, and thus, the magnetic tape cartridge has attracted increasing attention as a storage medium for big data and the like.

For example, a plurality of data bands parallel to a tape longitudinal direction is provided in a magnetic layer of a magnetic tape according to the LTO (Linear Tape Open) standard, and data is recorded on a plurality of recording tracks inside the plurality of data bands. Further, a plurality of servo bands parallel to the tape longitudinal direction is provided in the magnetic tape, and each data band is disposed in the magnetic layer so as to be sandwiched between the plurality of servo bands. A servo pattern having a predetermined shape is recorded in each servo band, the servo pattern executing positioning (tracking) control of a recording/reproducing head with respect to each recording track, tape information and servo band identification information for specifying a data band being embedded in the servo pattern.

In a timing-based servo type drive system adopted by the LTO standard, a servo technology that identifies a head position by using a non-parallel servo pattern and a time variable or distance variable is used. The non-parallel servo pattern typically includes two different azimuthal slopes arrayed in the tape longitudinal direction. This type of drive system generates a position error signal (PES) by reading a servo pattern and suitably positions a drive head with respect to the recording track.

With the need to increase the recording density in the current linear serpentine tape system, it is an important issue to improve the data band density.

For example, in LTO, when the cartridge capacity has the recording density exceeding 30 TB, in a tape-like magnetic recording medium, the tape length and width of the tape-like magnetic recording medium change due to changes in the temperature and humidity environment or the like and the shape is deformed over a long period of time due to the creep phenomenon. For this reason, it is difficult to easily increase the data band density of the tape-like magnetic recording medium.

In order to reduce the shape deformation of the tape-like magnetic recording medium, it is conceivable that the width of the data band should be narrowed. Narrowing the width of the data band means increasing the number of data bands. Increasing the number of data bands means increasing the number of servo bands between data bands.

In order to make it possible to recognize which of the plurality of data bands is being travelled, position information for specifying a servo band is written in the servo band provided alternately with the data band. Patent Literature 1 discloses a method of writing the same servo pattern in a plurality of servo bands at different positions in time (i.e., in different phases). Meanwhile, Patent Literature 2 discloses a method of writing different servo patterns in a plurality of servo bands without shifting the positions in time (i.e., in the same phase).

CITATION LIST

Patent Literature

Patent Literature 1: Japanese Unexamined Patent Application Publication No. 2011-523487
Patent Literature 2: Japanese Patent No. 6648855

DISCLOSURE OF INVENTION

Technical Problem

In order to recognize, by the method of shifting the writing position in time (Patent Literature 1), which of data bands is being travelled, servo signals of (number of servo bands−1) patterns are required in the time direction (number of servo bands/2). For this reason, in the case of writing position information in 10 or more servo bands, it takes time to reliably recognize which of data bands is being travelled.

Meanwhile, in the method of writing servo band identification information in servo signals (Patent Literature 2), servo signals are independently written for the respective servo bands. It is physically difficult to arrange 10 or more independent write heads for ½ inch (magnitude of the width of the tape-like magnetic recording medium) in terms of winding a coil.

In view of the circumstances as described above, it is an object of the present technology to provide a servo pattern recording method, a servo pattern recording apparatus, a method of producing a tape-like magnetic recording medium, a tape-like magnetic recording medium, and a servo write head, which are capable of easily coping with an increase in data band.

Solution to Problem

A servo pattern recording method according to an embodiment of the present disclosure is a servo pattern recording method of recording a servo pattern along a longitudinal direction of a tape-like magnetic recording medium, including:

determining a first servo band group that includes three or more first servo bands for recording a first servo pattern in which first servo band identification information having a plurality of bits is to be embedded, and a second servo band group that includes three or more second servo bands for recording a second servo pattern in which second servo band identification information having a plurality of bits is to be embedded, the second servo band identification information being different from the first servo band identification information; and recording the first servo band identification information on the first servo band group and the second servo band identification information on the second servo band group such that a combination of a first pair and a second pair is not duplicated between two servo bands adjacent to each other, the first pair being a pair of servo band identification information and a phase thereof in the longitudinal direction in one of the two servo bands read by a first servo read head, the second pair being a pair of servo band identification information and a phase thereof in the longitudinal direction in the other servo band read by a second servo read head.

The first servo band group may include three or more continuous first servo bands, and the second servo band group may include three or more continuous second servo bands.

The servo pattern recording method may further include determining a third servo band group that includes three or more third servo bands for recording a third servo pattern in which third servo band identification information having a plurality of bits is to be embedded, the third servo band identification information being different from the first servo band identification information and the second servo band identification information.

The third servo band group may include three or more continuous third servo bands.

The servo pattern recording method may further include determining a fourth servo band group that includes three or more fourth servo bands for recording a fourth servo pattern in which fourth servo band identification information having a plurality of bits is to be embedded, the fourth servo band identification information being different from the first servo band identification information, the second servo band identification information, and the third servo band identification information.

The fourth servo band group may include three or more continuous fourth servo bands.

A servo pattern recording apparatus according to an embodiment of the present disclosure is a servo pattern recording apparatus that records a servo pattern along a longitudinal direction of a tape-like magnetic recording medium, including:
  a servo write head that includes
    a first head block that includes three or more first magnetic gaps arranged corresponding to three or more continuous first servo bands, the three or more first magnetic gaps being arranged such that combinations of phases in the longitudinal direction of two adjacent first magnetic gaps included in the three or more first magnetic gaps are all different, and
    a second head block that includes three or more second magnetic gaps arranged corresponding to three or more continuous second servo bands, the three or more second magnetic gaps being arranged such that combinations of phases in the longitudinal direction of two adjacent second magnetic gaps included in the three or more second magnetic gaps are all different; and
  a drive unit that outputs, at same timing, a first recording signal for recording first servo band identification information having a plurality of bits to the first head block and a second recording signal for recording second servo band identification information having a plurality of bits to the second head block, the second servo band identification information being different from the first servo band identification information.

The servo write head may further include a third head block that includes three or more third magnetic gaps arranged corresponding to three or more continuous third servo bands, the three or more third magnetic gaps being arranged such that combinations of phases in the longitudinal direction of two adjacent third magnetic gaps included in the three or more third magnetic gaps are all different, and
  the drive unit may output, at the same timing, a third recording signal for recording third servo band identification information having a plurality of bits to the third head block, the third servo band identification information being different from the first servo band identification information and the second servo band identification information.

The servo write head may further include a different first head block that is not adjacent to the first head block, the different first head block may include one or two or more first magnetic gaps arranged corresponding to one or two or more continuous first servo bands, and combinations of two adjacent head blocks of the first head block, the second head block, the third head block, and the different first head block may be all different, and
  the drive unit may output, at the same timing, the first recording signal to the different first head block.

The first magnetic gap may be capable of recording, as the first servo band identification information, a plurality of servo frames that includes two or more different types of azimuthal slopes and encodes the first servo band identification information on the servo bands,
  the second magnetic gap may be capable of recording, as the second servo band identification information, a plurality of servo frames that includes two or more different types of azimuthal slopes and encodes the second servo band identification information on the servo bands, and
  the drive unit may output the first recording signal and the second recording signal at pulse rise times different from each other in accordance with a difference between the first servo band identification information and the second servo band identification information.

The first magnetic gap may be capable of recording, as the first servo band identification information, a plurality of servo frames that includes two or more different types of azimuthal slopes and encodes the first servo band identification information on the servo bands,
  the second magnetic gap may be capable of recording, as the second servo band identification information, a plurality of servo frames that includes two or more different types of azimuthal slopes and encodes the second servo band identification information on the servo bands,
  the third magnetic gap may be capable of recording, as the third servo band identification information, a plurality of servo frames that includes two or more different types of azimuthal slopes and encodes the third servo band identification information on the servo bands, and
  the drive unit may output the first recording signal, the second recording signal, and the third recording signal at pulse rise times different from each other in accordance with differences between the first servo band identification information, the second servo band identification information, and the third servo band identification information.

The first head block may be one head block in which the three or more first magnetic gaps are formed, and
  the second head block may be one head block in which the three or more second magnetic gaps are formed.

A method of producing a tape-like magnetic recording medium according to an embodiment of the present disclosure is a method of producing a tape-like magnetic recording medium that includes a magnetic layer including six or more servo bands extending in a longitudinal direction, including:
   determining a first servo band group that includes three or more first servo bands for recording a first servo pattern in which first servo band identification information having a plurality of bits is to be embedded, and a second servo band group that includes three or more second servo bands for recording a second servo pattern in which second servo band identification information having a plurality of bits is to be embedded, the second servo band identification information being different from the first servo band identification information; and
   recording the first servo band identification information on the first servo band group and the second servo band identification information on the second servo band group such that a combination of a first pair and a second pair is not duplicated between two servo bands adjacent to each other, the first pair being a pair of servo band identification information and a phase thereof in the longitudinal direction in one of the two servo bands read by a first servo read head, the second pair being a pair of servo band identification information and a phase thereof in the longitudinal direction in the other servo band read by a second servo read head.

A tape-like magnetic recording medium according to an embodiment of the present disclosure is a tape-like magnetic recording medium, including:
   a magnetic layer that includes a plurality of servo bands extending in a longitudinal direction,
   the magnetic layer including
      a first servo band group that includes three or more first servo bands, a first servo pattern being recorded on the three or more first servo bands, first servo band identification information having a plurality of bits being to be embedded in the first servo pattern, and
      a second servo band group that includes three or more second servo bands, a second servo pattern being recorded on the three or more second servo bands, second servo band identification information having a plurality of bits being to be embedded in the second servo pattern, the second servo band identification information being different from the first servo band identification information,
   combinations of a first pair and a second pair being all different between two servo bands adjacent to each other, the first pair being a pair of servo band identification information and a phase thereof in the longitudinal direction in one of the two servo bands read by a first servo read head, the second pair being a pair of servo band identification information and a phase thereof in the longitudinal direction in the other servo band read by a second servo read head.

The magnetic layer may further include a third servo band group that includes three or more third servo bands, a third servo pattern being recorded on the three or more third servo bands, third servo band identification information having a plurality of bits being to be embedded in the third servo pattern, the third servo band identification information being different from the first servo band identification information and the second servo band identification information.

The magnetic layer may further include a fourth servo band group that includes three or more fourth servo bands, a fourth servo pattern being recorded on the three or more fourth servo bands, fourth servo band identification information having a plurality of bits being to be embedded in the fourth servo pattern, the fourth servo band identification information being different from the first servo band identification information, the second servo band identification information, and the third servo band identification information.

The first servo band identification information may include a plurality of servo frames that includes two or more different types of azimuthal slopes and encodes the first servo band identification information,
   the second servo band identification information may include a plurality of servo frames that includes two or more different types of azimuthal slopes and encodes the second servo band identification information, and
   as the plurality of servo frames that encodes the first servo band identification information and the servo frames that encode the second servo band identification information are compared to each other, some of arrangement intervals of at least one of the two or more different types of azimuthal slopes may be different from each other.

The first servo band identification information may include a plurality of servo frames that includes two or more different types of azimuthal slopes and encodes the first servo band identification information,
   the second servo band identification information may include a plurality of servo frames that includes two or more different types of azimuthal slopes and encodes the second servo band identification information,
   the third servo band identification information may include a plurality of servo frames that includes two or more different types of azimuthal slopes and encodes the third servo band identification information, and
   as the plurality of servo frames that encodes the first servo band identification information, the servo frames that encode the second servo band identification information, and the plurality of servo frames that encodes the third servo band identification information are compared to each other, some of arrangement intervals of at least one of the two or more different types of azimuthal slopes may be different from each other.

The tape-like magnetic recording medium may further include
   a base material;
   an underlayer that is provided between one main surface of the base material and the magnetic layer; and
   a back layer that is provided on the other main surface of the base material.

A servo write head according to an embodiment of the present disclosure is a servo write head to be used for recording a servo pattern along a longitudinal direction of a tape-like magnetic recording medium, including
   a first head block that includes three or more first magnetic gaps arranged corresponding to three or more continuous first servo bands, the three or more first magnetic gaps being arranged such that combinations of phases in the longitudinal direction of two adjacent first magnetic gaps included in the three or more first magnetic gaps are all different; and
   a second head block that includes three or more second magnetic gaps arranged corresponding to three or more continuous second servo bands, the three or more second magnetic gaps being arranged such that combinations of phases in the longitudinal direction of two adjacent second magnetic gaps included in the three or more second magnetic gaps are all different,
   a first recording signal for recording first servo band identification information having a plurality of bits and a second recording signal for recording second servo band identification information having a plurality of bits being output at same timing to the first head block and the second head block, respectively, the second servo band identification information being different from the first servo band identification information.

MODE(S) FOR CARRYING OUT THE INVENTION

Figure 1:
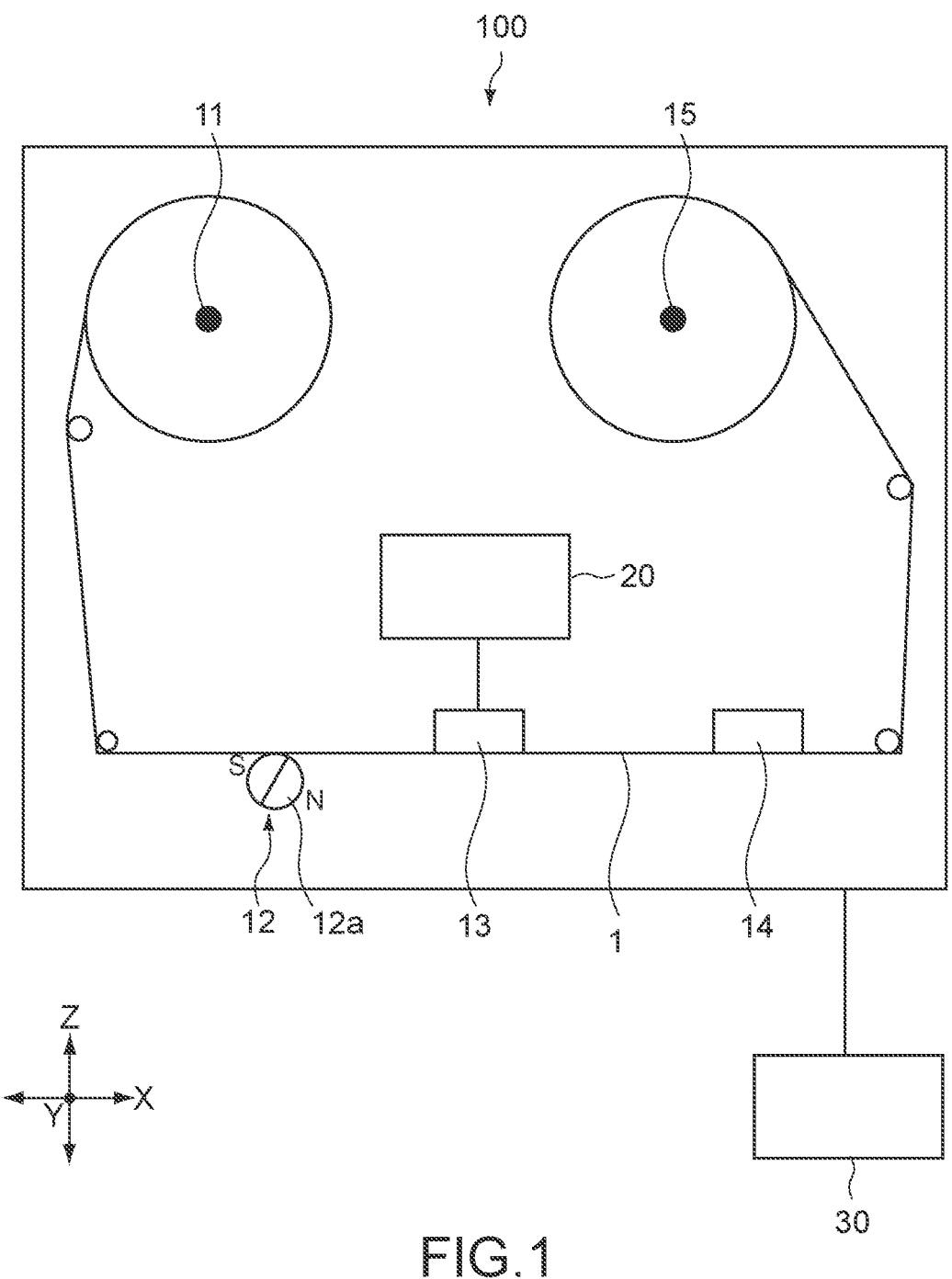
FIG. 1 is a front view showing a servo pattern recording apparatus according to an embodiment of the present technology.
Figure 2:
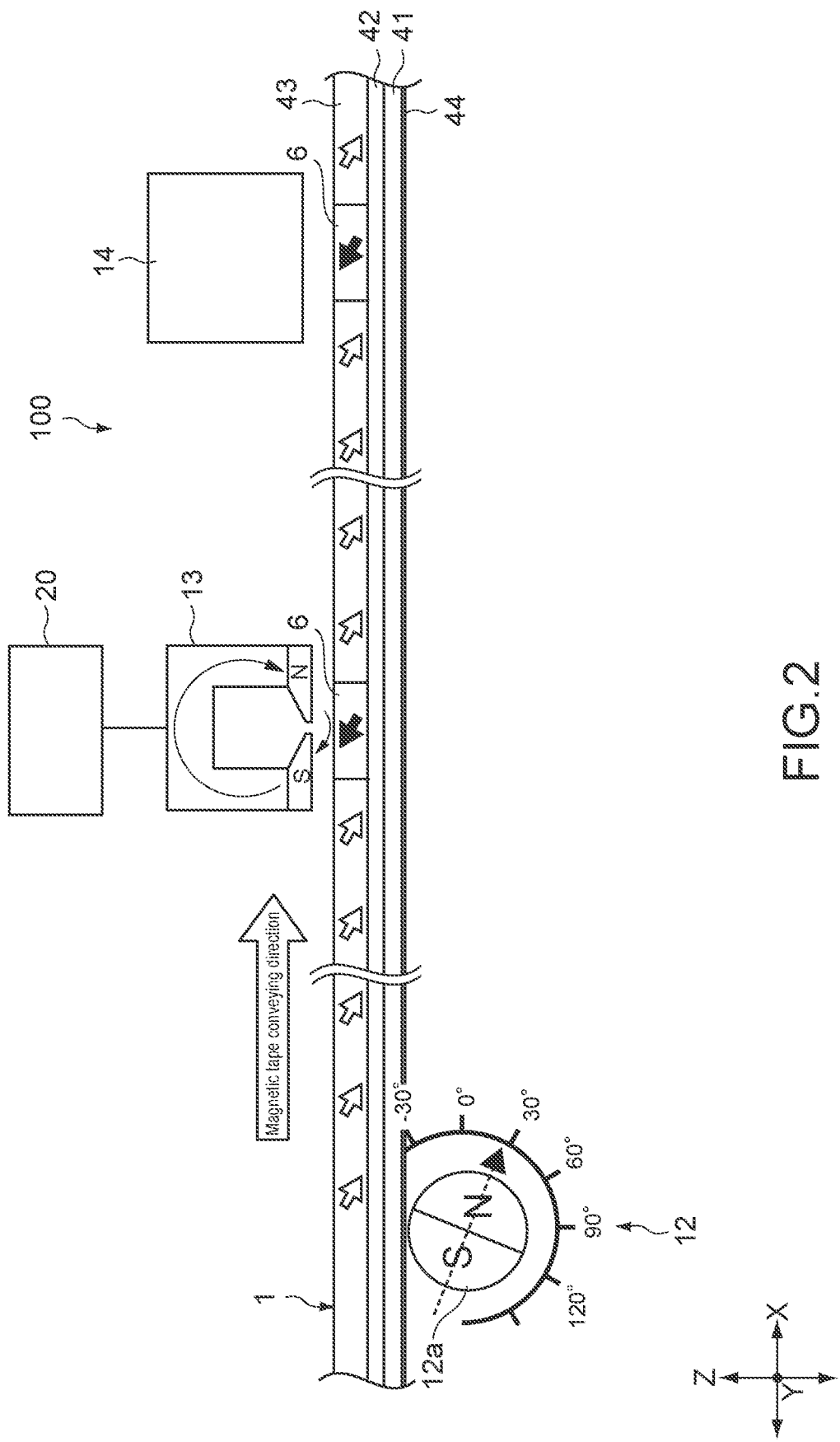
FIG. 2 is a partial enlarged view showing part of the servo pattern recording apparatus.
Figure 3:
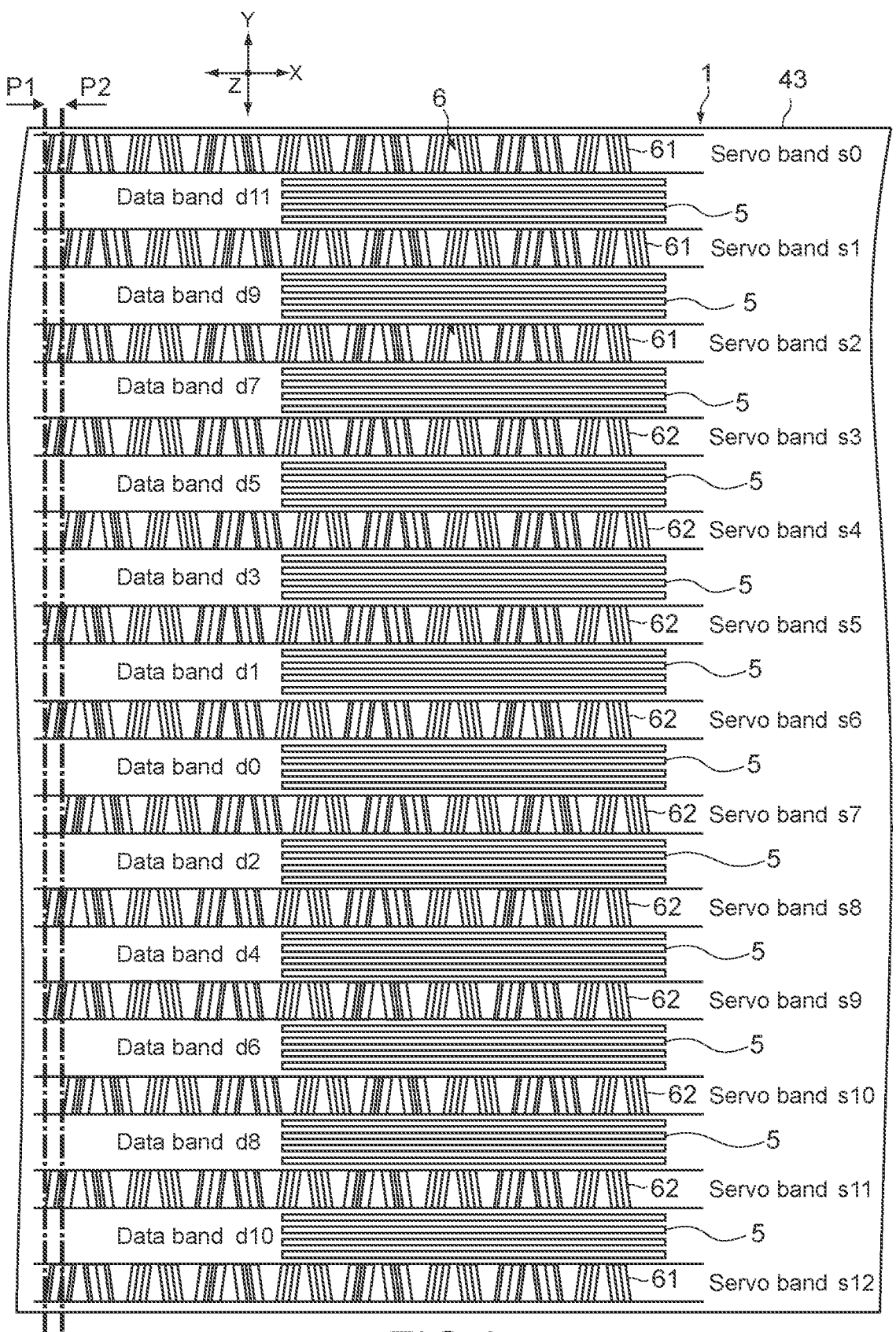
FIG. 3 is a top view of a magnetic tape showing servo band identification information forming part of a servo pattern.

FIG. 1 is a front view showing a servo pattern recording apparatus 100 according to the present technology. FIG. 2 is a partial enlarged view showing part of the servo pattern recording apparatus 100. FIG. 3 is a top view showing a magnetic tape 1 on which a servo pattern 6 is recorded.

Configuration of Magnetic Tape

First, a configuration of the magnetic tape 1 will be described with reference to FIG. 2. The magnetic tape 1 is a tape-shaped magnetic recording medium and includes a long base material (base) 41, an underlayer 42 provided on one main surface (first main surface) of the base material 41, a magnetic layer 43 provided on the underlayer 42, and a back layer 44 provided on the other main surface (second main surface) of the base material 41. Note that the underlayer 42 and the back layer 44 are provided as required and may be omitted. The magnetic tape 1 may be a magnetic recording medium of a perpendicular recording type or may be a magnetic recording medium of a longitudinal recording type.

The magnetic tape 1 has a long tape shape and is caused to travel in the longitudinal direction during recording and reproduction. Note that the surface of the magnetic layer 43 is a surface on which a magnetic head included in a recording/reproduction apparatus (not shown) is caused to travel. The magnetic tape 1 is favorably used in a recording/reproduction apparatus including a ring-type head as a recording head. The magnetic tape 1 is favorably used in a recording/reproduction apparatus configured to be capable of recording data with a data track width of 1500 nm or less or 1000 nm or less.

Base Material

The base material 41 is a non-magnetic support that supports the underlayer 42 and the magnetic layer 43. The base material 41 has a long film shape. The upper limit value of the average thickness of the base material 41 is favorably 4.2 µm or less, more favorably 3.8 µm or less, and still more favorably 3.4 µm or less. When the upper limit value of the average thickness of the base material 41 is 4.2 µm or less, it is possible to make the recording capacity of a single data cartridge larger than that of a general magnetic tape. The lower limit value of the average thickness of the base material 41 is favorably 3 µm or more, and more favorably 3.2 µm or more. When the lower limit value of the average thickness of the base material 41 is 3 µm or more, it is possible to suppress a decrease in the strength of the base material 41.

The average thickness of the base material 41 is obtained as follows. First, the magnetic tape 1 having a width of ½ inch is prepared and cut into a length of 250 mm to prepare a sample. Subsequently, the layers of the sample other than the base material 41 (i.e., the underlayer 42, the magnetic layer 43, and the back layer 44) are removed with a solvent such as MEK (methyl ethyl ketone) and dilute hydrochloric acid. Next, a Laser Hologage (LGH-110C) manufactured by Mitutoyo Corporation is used as a measuring apparatus to measure the thickness of the sample (base material 41) at five or more positions, and the measured values are simply averaged (arithmetically averaged) to calculate the average thickness of the base material 41. Note that the measurement positions are randomly selected from the sample.

The base material 41 contains polyester. When the base material 41 contains polyester, the Young's modulus of the base material 41 in the longitudinal direction can be reduced. Therefore, it is possible to keep the width of the magnetic tape 1 constant or substantially constant by adjusting the tension of the magnetic tape 1 in the longitudinal direction during travelling by the recording/reproduction apparatus.

The polyester includes, for example, at least one of polyethylene terephthalate (PET), polyethylene naphthalate (PEN), polybutylene terephthalate (PBT), polybutylene naphthalate (PBN), polycyclohexylene dimethylene terephthalate (PCT), polyethylene-p-oxybenzoate (PEB), or polyethylene bisphenoxycarboxylate. In the case where the base material 41 contains two or more types of polyesters, the two or more types of polyesters may be mixed, may be copolymerized, or may be stacked. At least one of the terminal or the side chain of the polyester may be modified.

The fact that the base material 41 contains polyester can be confirmed, for example, as follows. First, the layers of the sample other than the base material 41 are removed in a way similar to that in the measurement method of the average thickness of the base material 41. Next, the IR spectrum of the sample (base material 41) is acquired using the infrared absorption spectrometry (IR). On the basis of this IR spectrum, the fact that the base material 41 contains polyester can be confirmed.

The base material 41 may further contain, for example, at least one of polyamide, polyetheretherketone, polyimide, or polyamideimide in addition to the polyester, or may further contain at least one of polyamide, polyimide, polyamideimide, polyolefins, a cellulose derivative, a vinyl resin, or another polymer resin. The polyamide may be aromatic polyamide (aramid). The polyimide may be aromatic polyimide. The polyamideimide may be aromatic polyamideimide.

In the case where the base material 41 contains a polymer resin other than polyester, the base material 41 favorably contains polyester as a main component. Here, the main component means the component with the highest content (mass ratio), of the polymer resins contained in the base material 41. In the case where the base material 41 contains a polymer resin other than polyester, the polyester and the polymer resin other than the polyester may be mixed or may be copolymerized.

The base material 41 may be biaxially stretched in the longitudinal direction and the width direction. The polymer resin contained in the base material 41 is favorably oriented in an oblique direction with respect to the width direction of the base material 41.

Magnetic Layer

The magnetic layer 43 is a recording layer for recording a signal with a magnetization pattern. The magnetic layer 43 may be a recording layer of a perpendicular recording type or may be a recording layer of a longitudinal recording type. The magnetic layer 43 contains, for example, magnetic powder, a binder, and a lubricant. The magnetic layer 43 may further contain at least one additive of an antistatic agent, an abrasive, a curing agent, a rust inhibitor, a non-magnetic reinforcing particle, or the like, as necessary. The magnetic layer 43 does not necessarily need to include a coating film of a magnetic material and may include a sputtering film or a deposition film of a magnetic film.

An arithmetic average roughness Ra of the surface of the magnetic layer 43 is 2.0 nm or less, favorably 1.8 nm or less, and more favorably 1.6 nm or less. When the arithmetic average roughness Ra is 2.0 nm or less, since the output reduction due to spacing loss can be suppressed, excellent electromagnetic conversion characteristics can be achieved. The lower limit value of the arithmetic average roughness Ra of the surface of the magnetic layer 43 is favorably 1.0 nm or more, and more favorably 1.2 nm or more. When the lower limit value of the arithmetic average roughness Ra of the surface of the magnetic layer 43 is 1.0 nm or more, it is possible to suppress deterioration of the traveling property due to an increase in friction.

The arithmetic average roughness Ra can be obtained as follows. First, the surface of the magnetic layer 43 is observed by an atomic force microscope (AFM) to obtain an AFM image of 40 µm×40 µm. Nano Scope IIIa D3100 manufactured by Digital Instruments is used as the AFM, one formed of silicon single crystal is used as a cantilever (Note 1), and measurement is performed by turning at 200 to 400 Hz as the tapping frequency. Next, the AFM image is divided into 512×512 (=262,144) measurement points, a height $Z(i)$ (i: measurement point numbers, i=1 to 262,144) is measured at each measurement point, and the heights $Z(i)$ at the respective measurement points are simply averaged (arithmetically averaged) to obtain an average height (average surface) Zave (=(Z(1)+Z(2)+ . . . +Z(262,144))/262,144). Subsequently, a deviation $Z''(i)$ from an average center line at each measurement point (=$Z(i)$−Zave) is obtained to calculate the arithmetic average roughness Ra [nm] (=(Z''(1)+Z''(2)+ . . . +Z''(262,144))/262,144). At this time, one that has been subjected to filtering by second-order Flatten and third-order planefit in XY as image processing is used as data.

(Note 1) SPM probe NCH of a normal type, POINTPROBE manufactured by NanoWorld

L (cantilever length)=125 µm

The upper limit value of an average thickness $t_m$ of the magnetic layer 43 is 80 nm or less, favorably 70 nm or less, and more favorably 50 nm or less. When the upper limit value of the average thickness $t_m$ of the magnetic layer 43 is 80 nm or less, the influence of the demagnetizing field can be reduced in the case where a ring-type head is used as the recording head, and thus, more excellent electromagnetic conversion characteristics can be achieved.

The lower limit value of the average thickness $t_m$ of the magnetic layer 43 is favorably 35 nm or more. When the lower limit value of the average thickness $t_m$ of the magnetic layer 43 is 35 nm or more, the output can be ensured in the case where an MR-type head is used as the reproduction head, and thus, more excellent electromagnetic conversion characteristics can be achieved.

The average thickness $t_m$ of the magnetic layer 43 is obtained as follows. First, the magnetic tape 1 to be measured is processed by an FIB method or the like to obtain a slice. In the case of using an FIB method, a carbon layer and a tungsten layer are formed as protective films as pre-processing for observing a TEM image of a cross section described below. The carbon layer is formed on each of the surfaces of the magnetic tape 1 on the side of the magnetic layer 43 and on the side of the back layer 44 by a vapor deposition method and the tungsten layer is further formed on the surface on the side of the magnetic layer 43 by a vapor deposition method or a sputtering method. The slicing is performed in a length direction (longitudinal direction) of the magnetic tape 1. That is, the slicing forms a cross section parallel to both the longitudinal direction and the thickness direction of the magnetic tape 1.

The cross section described above of the obtained sliced sample is observed through a transmissionelectron microscope (TEM) under the following conditions to obtain a TEM image. Note that the magnification and the acceleration voltage may be adjusted as appropriate in accordance with the type of apparatus.

Apparatus: TEM (H9000NAR manufactured by Hitachi, Ltd.)
Acceleration voltage: 300 kV
Magnification: 100,000 times Next, the thickness of the magnetic layer 43 is measured at at least ten or more positions of the magnetic tape 1 in the longitudinal direction using the obtained TEM image. The average value obtained by simply averaging (arithmetically averaging) the obtained measured values is used as the average thickness $t_m$ [nm] of the magnetic layer 43. Note that the positions where the measurement described above is performed are randomly selected from the test piece.

Magnetic Powder

The magnetic powder includes a plurality of magnetic particles. The magnetic particles are, for example, particles including hexagonal ferrite (hereinafter, referred to as "hexagonal ferrite particles"), particles including epsilon-iron oxide (ε-iron oxide) (hereinafter, referred to as "ε-iron oxide particles"), or particles including Co-containing spinel ferrite (hereinafter, referred to as "cobalt ferrite particles"). The magnetic powder is favorably crystal-oriented preferentially in the thickness direction of the magnetic tape 1 (perpendicular direction).

Hexagonal Ferrite Particles

Each of the hexagonal ferrite particles has a plate shape such as a hexagonal plate shape. In this specification, the hexagonal plate shape includes a substantially hexagonal plate shape. The hexagonal ferrite contains favorably at least one of Ba, Sr, Pb, or Ca, and more favorably at least one of Ba or Sr. The hexagonal ferrite may specifically be barium ferrite or strontium ferrite, for example. The barium ferrite may further contain at least one of Sr, Pb, or Ca in addition to Ba. The strontium ferrite may further contain at least one of Ba, Pb, or Ca in addition to Sr.

More specifically, the hexagonal ferrite has an average composition represented by a general formula of $MFe_{12}O_{19}$. However, M is, for example, at least one metal of Ba, Sr, Pb, or Ca, and favorably at least one metal of Ba or Sr. M may be a combination of Ba and one or more metals selected from the group consisting of Sr, Pb, and Ca. Further, M may be a combination of Sr and one or more metals selected from the group consisting of Ba, Pb, and Ca. In the general formula described above, some Fes may be substituted by another metal element.

In the case where the magnetic powder includes powder of the hexagonal ferrite particles, the average particle size of the magnetic powder is favorably 30 nm or less, more favorably 12 nm or more and 25 nm or less, still more favorably 12 nm or more and 22 nm or less, particularly favorably 12 nm or more and 19 nm or less, and most favorably 12 nm or more and 16 nm or less. When the average particle size of the magnetic powder is 30 nm or less, more excellent electromagnetic conversion characteristics (e.g., SNR) can be achieved in the magnetic tape 1 having high recording density. Meanwhile, when the average particle size of the magnetic powder is 12 nm or more, the dispersibility of the magnetic powder is further improved and further excellent electromagnetic conversion characteristics (e.g., SNR) can be achieved.

The average aspect ratio of the magnetic powder is favorably 1.0 or more and 3.0 or less, more favorably 1.3 or more and 2.8 or less, and still more favorably 1.6 or more and 2.7 or less. When the average aspect ratio of the magnetic powder is within a range of 1.0 or more and 2.5 or less, agglomeration of the magnetic powder can be suppressed. Further, the resistance applied to the magnetic powder when perpendicularly orienting the magnetic powder in the process of forming the magnetic layer 43 can be suppressed. Therefore, it is possible to improve the perpendicular orientation property of the magnetic powder.

In the case where the magnetic powder includes powder of the hexagonal ferrite particles, the average particle size and the average aspect ratio of the magnetic powder are obtained as follows. First, the magnetic tape 1 to be measured is processed by an FIB method or the like to obtain a slice. In the case of using an FIB method, a carbon layer and a tungsten layer are formed as protective films as pre-processing for observing a TEM image of a cross section described below. The carbon layer is formed on each of the surfaces of the magnetic tape 1 on the side of the magnetic layer 43 and on the side of the back layer 44 by a vapor deposition method and the tungsten layer is further formed on the surface on the side of the magnetic layer 43 by a vapor deposition method or a sputtering method. The slicing is performed in a length direction (longitudinal direction) of the magnetic tape 1. That is, the slicing forms a cross section parallel to both the longitudinal direction and the thickness direction of the magnetic tape 1.

A transmission electron microscope (H-9500 manufactured by Hitachi High-Technologies Corporation) is used for observing the cross section described above of the obtained slice sample such that the entire magnetic layer 43 is included with respect to the thickness direction of the magnetic layer 43 at the acceleration voltage: 200 kV and the total magnification: 500,000 times to take a TEM photograph. Next, 50 particles, which have the side surface in the direction of the observation surface and have the thickness that can be clearly checked, are selected from the taken TEM photograph. A maximum plate thickness DA of each of the selected 50 particles, which have the thickness that can be clearly checked, is measured. The maximum plate thicknesses DA obtained in this way are simply averaged (arithmetically averaged) to obtain an average maximum plate thickness $DA_{ave}$. Subsequently, a plate diameter DB of each magnetic powder is measured. In order to measure the plate diameter DB of the particle, 50 particles whose plate diameter can be clearly checked are selected from the taken TEM photograph. The plate diameter DB of each of the selected 50 particles is measured. The plate diameters DB obtained in this way are simply averaged (arithmetically averaged) to obtain an average plate diameter $DB_{ave}$. The average plate diameter $DB_{ave}$ is the average particle size. Then, an average aspect ratio ($DB_{ave}/DA_{ave}$) of the particles is obtained on the basis of the average maximum plate thickness $DA_{ave}$ and the average plate diameter $DB_{ave}$.

In the case where the magnetic powder includes powder of the hexagonal ferrite particles, the average particle volume of the magnetic powder is favorably 3400 $nm^3$ or less, more favorably 400 $nm^3$ or more and 2600 $nm^3$ or less, still more favorably 400 $nm^3$ or more and 1700 $nm^3$ or less, particularly favorably 400 $nm^3$ or more and 1200 $nm^3$ or less, and most favorably 400 $nm^3$ or more and 1000 $nm^3$ or less. When the average particle volume of the magnetic powder is 3400 $nm^3$ or less, an effect similar to that in the case where the average particle size of the magnetic powder is 25 nm or less can be achieved. Meanwhile, when the average particle volume of the magnetic powder is 500 $nm^3$ or more, an effect similar to that in the case where the average particle size of the magnetic powder is 12 nm or more can be achieved.

The average particle volume of the magnetic powder is obtained as follows. First, as described above with respect to the method of calculating the average particle size of the magnetic powder, the average major axis length $DA_{ave}$ and the average plate diameter $DB_{ave}$ are obtained. Next, an average volume V of the magnetic powder is obtained in accordance with the following formula.

$$V = \frac{3\sqrt{3}}{8} \times DA_{ave} \times DB_{ave} \times DB_{ave} \qquad \text{[Math. 1]}$$

ε-Iron Oxide Particles

The ε-iron oxide particles are hard magnetic particles capable of achieving a high coercive force even as minute particles. The ε-iron oxide particles each have a spherical shape or a cubic shape. In this specification, the spherical shape includes a substantially spherical shape. Further, the cubic shape includes a substantially cubic shape. Since the ε-iron oxide particles have the shape as described above, it is possible to reduce the contact area of the particles in the thickness direction of the magnetic tape 1 and suppress agglomeration of the particles in the case where the ε-iron oxide particles are used as the magnetic particles, as compared with the case where barium ferrite particles having a hexagonal plate shape are used as the magnetic particles. Therefore, it is possible to enhance the dispersibility of the magnetic powder and achieve further excellent electromagnetic conversion characteristics (e.g., SNR).

Each of the ε-iron oxide particles has a core-shell structure. Specifically, the ε-iron oxide particle includes a core portion and a shell portion having a two-layer structure provided around the core portion. The shell portion having the two-layer structure includes a first shell portion provided on the core portion and a second shell portion provided on the first shell portion.

The core portion contains ε-iron oxide. The ε-iron oxide contained in the core portion is favorably one having $\varepsilon\text{-}Fe_2O_3$ crystals as the main phase, and more favorably one formed of single-phase $\varepsilon\text{-}Fe_2O_3$.

The first shell portion covers at least part of the periphery of the core portion. Specifically, the first shell portion may partially cover the periphery of the core portion or may entirely cover the periphery of the core portion. It is favorable that the first shell portion covers the entire surface of the core portion from the viewpoint of making the exchange coupling between the core portion and the first shell portion sufficient and improving the magnetic properties.

The first shell portion is a so-called soft magnetic layer and includes a soft magnetic material such as α-Fe, a Ni—Fe alloy, and an Fe—Si—Al alloy. The α-Fe may be obtained by reducing the ε-iron oxide contained in the core portion.

The second shell portion is an oxide film as an antioxidant layer. The second shell portion contains α-iron oxide, aluminum oxide, or silicon oxide. The α-iron oxide contains, for example, at least one iron oxide of $Fe_3O_4$, $Fe_2O_3$, or FeO. In the case where the first shell portion contains α-Fe (soft magnetic material), the α-iron oxide may be obtained by oxidizing α-Fe contained in the first shell portion.

Since the ε-iron oxide particle includes the first shell portion as described above, it is possible to adjust a coercive force Hc of the entire ε-iron oxide particles (core-shell particles) to the coercive force Hc suitable for recording while maintaining the coercive force Hc of the core portion alone at a large value for achieving thermal stability. Further, since the ε-iron oxide particle includes the second shell portion as described above, it is possible to suppress deterioration of the properties of the ε-iron oxide particles due to the ε-iron oxide particles being exposed to the air and the surfaces of the particles being rusted in the process of producing the magnetic tape 1 and before the process. Therefore, it is possible to suppress deterioration of the properties of the magnetic tape 1.

The ε-iron oxide particle may include a shell portion having a single-layer structure. In this case, the shell portion has a configuration similar to that of the first shell portion. However, from the viewpoint of suppressing deterioration of the properties of the ε-iron oxide particles, it is favorable that the ε-iron oxide particle includes the shell portion having a two-layer structure, as described above.

The ε-iron oxide particles may include an additive instead of the core-shell structure described above or may include an additive while having the core-shell structure. In this case, some Fes of the ε-iron oxide particles is substituted by the additive. Also with the ε-iron oxide particles including the additive, the coercive force Hc of the entire ε-iron oxide particles can be adjusted to the coercive force Hc suitable for recording, and thus, it is possible to improve the easiness of recording. The additive is a metal element other than iron, favorably a trivalent metal element, more favorably at least one of Al, Ga, or In, and sill more favorably at least one of Al or Ga.

Specifically, the ε-iron oxide including the additive is $\varepsilon\text{-}Fe_{2-x}M_xO_3$ crystals (where M is a metal element other than iron, favorably a trivalent metal element, more favorably at least one of Al, Ga, or In, and still more favorably at least one of Al or Ga. x is, for example, $0<x<1$.).

The average particle size (average maximum particle size) of the magnetic powder is, for example, 22 nm or less. The average particle size (average maximum particle size) of the magnetic powder is favorably 20 nm or less, more favorably 8 nm or more and 20 nm or less, still more favorably 10 nm or more and 18 nm or less, particularly favorably 10 nm or more and 16 nm or less, and most favorably 10 nm or more and 14 nm or less. In the magnetic tape 1, a region having a size of ½ of the recording wavelength is an actual magnetized region. For this reason, by setting the average particle size of the magnetic powder to half or less of the shortest recording wavelength, it is possible to achieve more excellent electromagnetic conversion characteristics (e.g., SNR). Therefore, in the case where the average particle size of the magnetic powder is 22 nm or less, it is possible to achieve more excellent electromagnetic conversion characteristics (e.g., SNR) in the magnetic tape 1 having high recording density (e.g., the magnetic tape 1 configured to be capable of recording a signal at the shortest recording wavelength of 44 nm or less). Meanwhile, when the average particle size of the magnetic powder is 8 nm or more, the dispersibility of the magnetic powder is further improved and it is possible to achieve more excellent electromagnetic conversion characteristics (e.g., SNR).

The average aspect ratio of the magnetic powder is favorably 1.0 or more and 3.0 or less, more favorably 1.0 or more and 2.5 or less, still more favorably 1.0 or more and 2.1 or less, and particularly favorably 1.0 or more and 1.8 or less. When the average aspect ratio of the magnetic powder is within a range of 1.0 or more and 3.0 or less, it is possible to suppress agglomeration of the magnetic powder. Further, the resistance applied to the magnetic powder when perpendicularly orienting the magnetic powder in the process of forming the magnetic layer 43 can be suppressed. Therefore, it is possible to improve the perpendicular orientation property of the magnetic powder.

In the case where the magnetic powder includes powder of the ε-iron oxide particles, the average particle size and the average aspect ratio of the magnetic powder are obtained as follows. First, the magnetic tape 1 to be measured is processed by an FIB (Focused Ion Beam) method or the like to obtain a slice. In the case of using an FIB method, a carbon layer and a tungsten layer are formed as protective layers as pre-processing for observing a TEM image of a cross section described below. The carbon layer is formed on each of the surfaces of the magnetic tape 1 on the side of the magnetic layer 43 and on the side of the back layer 44 by a vapor deposition method and the tungsten layer is further formed on the surface on the side of the magnetic layer 43 by a vapor deposition method or a sputtering method. The slicing is performed in a length direction (longitudinal direction) of the magnetic tape 1. That is, the slicing forms a cross section parallel to both the longitudinal direction and the thickness direction of the magnetic tape 1.

A transmission electron microscope (H-9500 manufactured by Hitachi High-Technologies Corporation) is used for observing the cross section described above of the obtained slice sample such that the entire magnetic layer 43 is included with respect to the thickness direction of the magnetic layer 43 at the acceleration voltage: 200 kV and the total magnification: 500,000 times to take a TEM photograph. Next, 50 particles, which have the shape that can be clearly checked, are selected from the taken TEM photograph, and a long-axis length DL and a short-axis length DS of each particle are measured. Here, the long-axis length DL means the maximum one (so-called maximum Feret diameter) of distances between two parallel lines drawn at any angle so as to be in contact with the outline of each particle. Meanwhile, the short-axis length DS means the maximum one of particle lengths in a direction orthogonal to a long axis (DL) of the particle. Subsequently, the measured long-axis lengths DL of the 50 particles are simply averaged (arithmetically averaged) to obtain an average major axis length $DL_{ave}$. The average major axis length $DL_{ave}$ obtained in this way is used as the average particle size of the magnetic powder. Further, the measured short-axis lengths DS of the 50 particles are simply averaged (arithmetically averaged) to obtain an average short-axis length $DS_{ave}$. Then, an average aspect ratio ($DL_{ave}/DS_{ave}$) of the particles is obtained on the basis of the average major axis length $DL_{ave}$ and the average short-axis length $DS_{ave}$.

The average particle volume of the magnetic powder is favorably 5600 nm³ or less, more favorably 250 nm³ or more and 4200 nm³ or less, still more favorably 600 nm³ or more and 3000 nm³ or less, particularly favorably 600 nm³ or more and 2200 nm³ or less, and most favorably 600 nm³ or more and 1500 nm³ or less. Since noise of the magnetic tape 1 is generally inversely proportional to the square root of the number of particles (i.e., proportional to the square root of the particle volume), it is possible to achieve more excellent electromagnetic conversion characteristics (e.g., SNR) by making the particle volume smaller. Therefore, when the average particle volume of the magnetic powder is 5600 nm³ or less, it is possible to achieve more excellent electromagnetic conversion characteristics (e.g., SNR) as in the case where the average particle size of the magnetic powder is 22 nm or less. Meanwhile, when the particle volume of the magnetic powder is 250 nm³ or more, an effect similar to that in the case where the average particle size of the magnetic powder is 8 nm or more can be achieved.

In the case where the ε-iron oxide particles each have a spherical shape, the average particle volume of the magnetic powder is obtained as follows. First, the average major axis length $DL_{ave}$ is obtained in a way similar to the method of calculating the average particle size of the magnetic powder described above. Next, the average volume V of the magnetic powder is obtained in accordance with the following formula.

$$V = (\pi/6) \times DL_{ave}^3$$

In the case where the ε-iron oxide particles each have a cubic shape, the average volume of the magnetic powder can be obtained as follows. The magnetic tape 1 is processed by an FIB (Focused Ion Beam) method or the like to obtain a slice. In the case of using an FIB method, a carbon film and a tungsten thin film are formed as protective films as pre-processing for observing a TEM image of a cross section described below. The carbon film is formed on each of the surfaces of the magnetic tape 1 on the side of the magnetic layer 43 and on the side of the back layer 44 by a vapor deposition method and the tungsten thin film is further formed on the surface on the side of the magnetic layer 43 by a vapor deposition method or a sputtering method. The slicing is performed in a length direction (longitudinal direction) of the magnetic tape 1. That is, the slicing forms a cross section parallel to both the longitudinal direction and the thickness direction of the magnetic tape 1.

A transmission electron microscope (H-9500 manufactured by Hitachi High-Technologies Corporation) is used for observing the cross section of the obtained slice sample such that the entire magnetic layer 43 is included with respect to the thickness direction of the magnetic layer 43 at the acceleration voltage: 200 kV and the total magnification: 500,000 times to take a TEM photograph. Note that the magnification and the acceleration voltage may be adjusted as appropriate in accordance with the type of apparatus. Next, 50 particles, which have a clear shape, are selected from the taken TEM photograph, and a length DC of a side of each particle is measured. Subsequently, the measured lengths DC of the 50 particles are simply averaged (arithmetically averaged) to obtain an average side length $DC_{ave}$ Next, an average volume V ave (particle volume) of the magnetic powder is obtained on the basis of the following formula by using the average side length $DC_{ave}$ $$V_{ave} = DC_{ave}^3$$

Cobalt Ferrite Particles

It is favorable that the cobalt ferrite particles each have uniaxial crystal anisotropy. Since the cobalt ferrite particle has uniaxial crystal anisotropy, it is possible to make the magnetic powder preferentially crystal-oriented in the thickness direction (perpendicular direction) of the magnetic tape 1. The cobalt ferrite particle has, for example, a cubic shape. In this specification, the cubic shape includes a substantially cubic shape. The Co-containing spinel ferrite may further contain at least one of Ni, Mn, Al, Cu, or Zn in addition to Co.

The Co-containing spinel ferrite has an average composition represented by the following formula, for example.

(where M is, for example, at least one metal of Ni, Mn, Al, Cu, or Zn. x is a value in a range of $0.4 \leq x \leq 1.0$. y is a value in a range of $0 \leq y \leq 0.3$. However, x and y satisfy the relationship of $(x+y) \leq 1.0$. z is a value in a range of $3 \leq z \leq 4$. Some Fes may be substituted by another metal element.)

In the case where the magnetic powder includes powder of the cobalt ferrite particles, the average particle size of the magnetic powder is 22 nm or less. The average particle size (average maximum particle size) of the magnetic powder is favorably 20 nm or less, more favorably 8 nm or more and 20 nm or less, still more favorably 10 nm or more and 18 nm or less, particularly favorably 10 nm or more and 16 nm or less, and most favorably 10 nm or more and 14 nm or less. When the average particle size of the magnetic powder is 22 nm or less, it is possible to achieve more excellent electromagnetic conversion characteristics (e.g., SNR) in the magnetic tape 1 having high recording density. Meanwhile, when the average particle size of the magnetic powder is 8 nm or more, the dispersibility of the magnetic powder is further improved, and it is possible to achieve more excellent electromagnetic conversion characteristics (e.g., SNR). The method of calculating the average particle size of the magnetic powder is similar to the method of calculating the average particle size of the magnetic powder in the case where the magnetic powder includes powder of the ε-iron oxide particles.

The average aspect ratio of the magnetic powder is favorably 1.0 or more and 3.0 or less, more favorably 1.0 or more and 2.5 or less, still more favorably 1.0 or more and 2.1 or less, and particularly favorably 1.0 or more and 1.8 or less. When the average aspect ratio of the magnetic powder is within a range of 1.0 or more and 3.0 or less, it is possible to suppress agglomeration of the magnetic powder. Further, the resistance applied to the magnetic powder when perpendicularly orienting the magnetic powder in the process of forming the magnetic layer 43 can be suppressed. Therefore, it is possible to improve the perpendicular orientation property of the magnetic powder. The method of calculating the average aspect ratio of the magnetic powder is similar to the method of calculating the average aspect ratio of the magnetic powder in the case where the magnetic powder includes powder of the ε-iron oxide particles.

The average particle volume of the magnetic powder is favorably 5600 $nm^3$ or less, more favorably 250 $nm^3$ or more and 4200 $nm^3$ or less, still more favorably 600 $nm^3$ or more and 3000 $nm^3$ or less, particularly favorably 600 $nm^3$ or more and 2200 $nm^3$ or less, and most favorably 600 $nm^3$ or more and 1500 $nm^3$ or less. When the average particle volume of the magnetic powder is 5600 $nm^3$ or less, an effect similar that in the case where the average particle size of the magnetic powder is 25 nm or less can be achieved. Meanwhile, when the average particle volume of the magnetic powder is 500 $nm^3$ or more, an effect similar to that in the case where the average particle size of the magnetic powder is 8 nm or more can be achieved. The method of calculating the average particle volume of the magnetic powder is similar to the method of calculating the average particle volume in the case where the ε-iron oxide particle has a cubic shape.

Binder

Examples of the binder include a thermoplastic resin, a thermosetting resin, and a reactive resin. Examples of the thermoplastic resin include vinyl chloride, vinyl acetate, a vinyl chloride-vinyl acetate copolymer, a vinyl chloride-vinylidene chloride copolymer, a vinyl chloride-acrylonitrile copolymer, an acrylic acid ester-acrylonitrile copolymer, an acrylic acid ester-vinyl chloride-vinylidene chloride copolymer, an acrylic acid ester-acrylonitrile copolymer, an acrylic acid ester-vinylidene chloride copolymer, a methacrylic acid ester-vinylidene chloride copolymer, a methacrylic acid ester-vinyl chloride copolymer, a methacrylic acid ester-ethylene copolymer, polyvinyl fluoride, a vinylidene chloride-acrylonitrile copolymer, an acrylonitrile-butadiene copolymer, a polyamide resin, polyvinyl butyral, a cellulose derivative (cellulose acetate butyrate, cellulose diacetate, cellulose triacetate, cellulose propionate, nitrocellulose), a styrene butadiene copolymer, a polyurethane resin, a polyester resin, an amino resin, and synthetic rubber.

Examples of the thermosetting resin include a phenolic resin, an epoxy resin, a polyurethane curable resin, a urea resin, a melamine resin, an alkyd resin, a silicone resin, a polyamine resin, and a urea-formaldehyde resin.

For the purpose of improving the dispersibility of the magnetic powder, $-SO_3M$, $-OSO_3M$, $-COOM$, $P=O(OM)_2$ (where M represents a hydrogen atom or an alkali metal such as lithium, potassium, and sodium), a side chain amine having a terminal group represented by $-NR1R2$, $-NR1R2R3^+X^-$, a main chain amine represented by $>NR1R2^+X^-$ (where R1, R2, and R3 each represent a hydrogen atom or a hydrocarbon group, and $X^-$ represents a halogen element ion such as fluorine, chlorine, bromine, and iodine, an inorganic ion, or an organic ion), and a polar functional group such as $-OH$, $-SH$, $-CN$, and an epoxy group may be introduced into all the binders described above. The amount of the polar functional groups introduced into the binders is favorably $10^{-1}$ to $10^{-8}$ mol/g, and more favorably $10^{-2}$ to $10^{-6}$ mol/g.

Lubricant

The lubricant contains, for example, at least one of a fatty acid or a fatty acid ester, and favorably both a fatty acid and a fatty acid ester. Containing a lubricant in the magnetic layer 43, particularly, containing both a fatty acid and a fatty acid ester in the magnetic layer 43, contributes to improving the travelling stability of the magnetic tape 1. More particularly, when the magnetic layer 43 contains a lubricant and has a pore, favorable travelling stability can be achieved. It is conceivable that the improvement in the travelling stability can be achieved because the dynamic friction coefficient of the surface of the magnetic tape 1 on the side of the magnetic layer 43 is adjusted to the value suitable for travelling of the magnetic tape 1 by the lubricant described above.

The fatty acid may favorably be a compound represented by the following general formula (1) or (2). For example, one of the compound represented by the following general formula (1) and the compound represented by the general formula (2) may be contained as a fatty acid, or both of them may be contained.

Further, the fatty acid ester may favorably be a compound represented by the following general formula (3) or (4). For example, one of the compound represented by the following general formula (3) and the compound represented by the general formula (4) may be contained as the fatty acid ester, or both of them may be contained.

When the lubricant contains one or both of the compound represented by the general formula (1) and the compound represented by the general formula (2) and one or both of the compound represented by the general formula (3) and the compound represented by the general formula (4), it is possible to suppress an increase in dynamic friction coefficient due to repeated recording or reproduction of the magnetic tape 1.

$$CH_3(CH_2)_k COOH \qquad (1)$$

(However, in the general formula (1), k is an integer selected from a range of 14 or more and 22 or less, and more favorably a range of 14 or more and 18 or less.)

$$CH_3(CH_2)_n CH=CH(CH_2)_m COOH \qquad (2)$$

(However, in the general formula (2), the sum of n and m is an integer selected from a range of 12 or more and 20 or less, and more favorably a range of 14 or more and 18 or less.)

$$CH_3(CH_2)_p COO(CH_2)_q CH_3 \qquad (3)$$

(However, in the general formula (3), p is an integer selected from a range of 14 or more and 22 or less, and more favorably a range of 14 or more and 18 or less, and q is an integer selected from a range of 2 or more and 5 or less, and more favorably a range of 2 or more and 4 or less.)

$$CH_3(CH_2)_x COO-(CH_2)_s CH(CH_3)_2 \qquad (4)$$

(However, in the general formula (4), r is an integer selected from a range of 14 or more and 22 or less, and s is an integer selected from a range of 1 or more and 3 or less.)

Antistatic Agent

Examples of the antistatic agent include carbon black, natural surfactant, nonionic surfactant, and cationic surfactant.

Abrasive

Examples of the abrasive include α-alumina, β-alumina, and γ-alumina having an α-transformation rate of 90% or more, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, acicular α-iron oxide obtained by dehydrating a raw material of magnetic iron oxide and performing annealing treatment thereon, and those obtained by performing surface treatment on them with aluminum and/or silica as necessary.

Curing Agent

Examples of the curing agent include a polyisocyanate. Examples of the polyisocyanate include an aromatic polyisocyanate such as an adduct of tolylene diisocyanate (TDI) and an active hydrogen compound, and an aliphatic polyisocyanate such as an adduct of hexamethylene diisocyanate (HMDI) and an active hydrogen compound. The weight average molecular weight of the polyisocyanates is desirably in a range of 100 to 3000.

Rust Inhibitor

Examples of the rust inhibitor include phenols, naphthols, quinones, a heterocyclic compound containing a nitrogen atom, a heterocyclic compound containing an oxygen atom, and a heterocyclic compound containing a sulfur atom.

Non-Magnetic Reinforcing Particle

Examples of the non-magnetic reinforcing particle include aluminum oxide (a, or y alumina), chromium oxide, silicon oxide, diamond, garnet, emery, boron nitride, titanium carbide, silicon carbide, titanium carbide, and titanium oxide (rutile or anatase titanium oxide).

Underlayer

The underlayer 42 is for reducing the recesses and projections on the surface of the base material 41 and adjusting the recesses and projections on the surface of the magnetic layer 43. The underlayer 42 is a non-magnetic layer containing a non-magnetic powder, a binder, and a lubricant. The underlayer 42 supplies the lubricant to the surface of the magnetic layer 43. The underlayer 42 may further contain at least one additive of an antistatic agent, a curing agent, a rust inhibitor, or the like as necessary.

The average thickness of the underlayer 42 is favorably 0.3 µm or more and 2.0 µm or less, and more favorably 0.5 µm or more and 1.4 µm or less. Note that the average thickness of the underlayer 42 is obtained in a way similar to that for the average thickness of the magnetic layer 43. However, the magnification of the TEM image is adjusted as appropriate in accordance with the thickness of the underlayer 42. When the average thickness of the underlayer 42 is 2.0 µm or less, the stretchability of the magnetic tape 1 due to external force further increases, and thus, adjustment of the width of the magnetic tape 1 by tension adjustment becomes easier.

Non-Magnetic Powder

The non-magnetic powder includes, for example, at least one of inorganic particle powder or organic particle powder. Further, the non-magnetic powder may include carbon powder such as carbon black. Note that one type of non-magnetic powder may be used alone or two or more types of non-magnetic powder may be used in combination. The inorganic particles contain, for example, a metal, a metal oxide, a metal carbonate, a metal sulfate, a metal nitride, a metal carbide, a metal sulfide, or the like. Examples of the shape of the non-magnetic powder include, but not limited to, various shapes such as a needle shape, a spherical shape, a cubic shape, and a plate shape.

Binder and Lubricant

The binder and the lubricant are similar to those of the magnetic layer 43 described above.

Additive

The antistatic agent, the curing agent, and the rust inhibitor are similar to those of the magnetic layer 43 described above.

Back Layer

The back layer 44 contains a binder and non-magnetic powder. The back layer 44 may further contain at least one additive of a lubricant, a curing agent, an antistatic agent, or the like as necessary. The binder and the non-magnetic powder are similar to those of the underlayer 42 described above.

The average particle size of the non-magnetic powder is favorably 10 nm or more and 150 nm or less, and more favorably 15 nm or more and 110 nm or less. The average particle size of the non-magnetic powder is obtained in a way similar to that for the average particle size of the magnetic powder described above. The non-magnetic powder may include non-magnetic powder having two or more granularity distributions.

The upper limit value of the average thickness of the back layer 44 is favorably 0.6 μm or less. When the upper limit value of the average thickness of the back layer 44 is 0.6 μm or less, the underlayer 42 and the base material 41 can be kept thick even in the case where the average thickness of the magnetic tape 1 is 5.6 μm or less, and thus, it is possible to maintain the travelling stability of the magnetic tape 1 in the recording/reproduction apparatus. The lower limit value of the average thickness of the back layer 44 is not particularly limited, but is, for example, 0.2 μm or more.

An average thickness $t_b$ of the back layer 44 is obtained as follows. First, an average thickness $t_T$ of the magnetic tape 1 is measured. The measurement method of the average thickness $t_T$ is as described in the following "Average thickness of magnetic tape". Subsequently, the back layer 44 of the sample is removed with a solvent such as MEK (methyl ethyl ketone) and dilute hydrochloric acid. Next, a Laser Hologage (LGH-110C) manufactured by Mitutoyo Corporation is used to measure the thickness of the sample at five or more positions, and the measured values are simply averaged (arithmetically averaged) to calculate an average value $t_B$ [μm]. After that, the average thickness $t_b$ [μm] of the back layer 44 is obtained in accordance with the following formula. Note that the measurement positions are randomly selected from the sample.

$$t_b[\mu m]=t_T[\mu m]-t_B[\mu m]$$

The back layer 44 has a surface provided with numerous protruding portions. The numerous protruding portions are for forming numerous hole portions in the surface of the magnetic layer 43 under a state in which the magnetic tape 1 has been wound in a roll shape. The numerous hole portions are formed by numerous non-magnetic particles protruding from the surface of the back layer 44, for example.

(Average Thickness of Magnetic Tape)

The upper limit value of the average thickness (average total thickness) $t_T$ of the magnetic tape 1 is 5.6 μm or less, favorably 5.0 μm or less, more favorably 4.6 μm or less, and still more favorably 4.4 μm or less. When the average thickness $t_T$ of the magnetic tape 1 is 5.6 μm or less, it is possible to make the recording capacity of a single data cartridge larger than that of a general magnetic tape. The lower limit value of the average thickness $t_T$ of the magnetic tape 1 is not particularly limited, but is, for example, 3.5 μm or more.

The average thickness $t_T$ of the magnetic tape 1 is obtained as follows. First, the magnetic tape 1 having a width of ½ inch is prepared and cut into a length of 250 mm to prepare a sample. Next, a Laser Hologage (LGH-110C) manufactured by Mitutoyo Corporation is used as a measuring apparatus to measure the thickness of the sample at five or more positions, and the measured values are simply averaged (arithmetically averaged) to calculate an average value $t_T$ [μm]. Note that the measurement positions are randomly selected from the sample.

(Coercive Force Hc)

The upper limit value of a coercive force Hc2 of the magnetic layer 43 in the longitudinal direction of the magnetic tape 1 is favorably 2000 Oe or less, more favorably 1900 Oe or less, and still more favorably 1800 Oe or less. When the coercive force Hc2 of the magnetic layer 43 in the longitudinal direction is 2000 Oe or less, sufficient electromagnetic conversion characteristics can be provided even with high recording density.

The lower limit value of the coercive force Hc2 of the magnetic layer 43 measured in the longitudinal direction of the magnetic tape 1 is favorably 1000 Oe or more. When the coercive force Hc2 of the magnetic layer 43 measured in the longitudinal direction is 1000 Oe or more, it is possible to suppress demagnetization due to leakage flux from the recording head.

The coercive force Hc2 described above is obtained as follows. First, three magnetic tapes 1 are superimposed with double sided tape, and then punched out with a punch of φ6.39 mm to prepare a measurement sample. At this time, marking is performed with arbitrary non-magnetic ink such that the longitudinal direction (travelling direction) of the magnetic tape 1 can be recognized. Then, a vibrating sample magnetometer (VSM) is used to measure the M-H loop of the measurement sample (the entire magnetic tape 1) corresponding to the longitudinal direction (travelling direction) of the magnetic tape 1. Next, acetone, ethanol, or the like is used to wipe off the coating film (the underlayer 42, the magnetic layer 43, the back layer 44, and the like), leaving only the base material 41. Then, three obtained base materials 41 are superimposed with double sided tape, and then punched out with a punch of φ6.39 mm to prepare a sample for background correction (hereinafter, referred to simply as "correction sample"). After that, the M-H loop of the correction sample (base material 41) corresponding to the perpendicular direction of the base material 41 (perpendicular direction of the magnetic tape 1) is measured using the VSM.

In the measurement of the M-H loop of the measurement sample (the entire magnetic tape 1) and the M-H loop of the correction sample (base material 41), a High Sensitivity Vibrating Sample Magnetometer "VSM-P7-15" manufactured by TOEI INDUSTRY CO., LTD. is used. The measurement conditions are the measurement mode: full-loop, the maximum magnetic field: 15 kOe, the magnetic field step: 40 bits, the time constant of locking amp: 0.3 sec, the waiting time: 1 sec, and the MH average number: 20.

After the M-H loop of the measurement sample (the entire magnetic tape 1) and the M-H loop of the correction sample (base material 41) are obtained, the M-H loop of the correction sample (base material 41) is subtracted from the M-H loop of the measurement sample (the entire magnetic tape 1) to perform background correction, thereby obtaining the M-H loop after background correction. A measurement/analysis program attached to the "VSM-P7-15" is used for this calculation of background correction. The coercive force Hc2 is obtained on the basis of the obtained M-H loop after background correction. Note that the measurement/analysis program attached to the "VSM-P7-15" is used for this calculation. Note that the measurement of the M-H loop described above is performed at 25° C. Further, the "demagnetizing field correction" in measuring the M-H loop in the longitudinal direction of the magnetic tape 1 is not performed.

(Squareness Ratio)

A squareness ratio S1 of the magnetic layer 43 in the perpendicular direction (thickness direction) of the magnetic tape 1 is favorably 65% or more, more favorably 70% or more, still more favorably 75% or more, particularly favorably 80% or more, and most favorably 85% or more. When the squareness ratio S1 is 65% or more, the perpendicular orientation property of the magnetic powder is sufficiently high, and thus, it is possible to achieve more excellent electromagnetic conversion characteristics (e.g., SNR).

The squareness ratio S1 in the perpendicular direction is obtained as follows. First, three magnetic tapes 1 are superimposed with double sided tape, and then punched out with a punch of φ6.39 mm to prepare a measurement sample. At this time, marking is performed with arbitrary non-magnetic ink such that the longitudinal direction (travelling direction) of the magnetic tape 1 can be recognized. Then, the M-H loop of the measurement sample (the entire magnetic tape 1) corresponding to the perpendicular direction (thickness direction) of the magnetic tape 1 is measured using the VSM. Next, acetone, ethanol, or the like is used to wipe off the coating film (the underlayer 42, the magnetic layer 43, the back layer 44, and the like), leaving only the base material 41. Then, three obtained base materials 41 are superimposed with double sided tape, and then punched out with a punch of φ6.39 mm to prepare a sample for background correction (hereinafter, referred to simply as "correction sample"). After that, the M-H loop of the correction sample (base material 41) corresponding to the perpendicular direction of the base material 41 (perpendicular direction of the magnetic tape 1) is measured using the VSM.

In the measurement of the M-H loop of the measurement sample (the entire magnetic tape 1) and the M-H loop of the correction sample (base material 41), a High Sensitivity Vibrating Sample Magnetometer "VSM-P7-15" manufactured by TOEI INDUSTRY CO., LTD. is used. The measurement conditions are the measurement mode: full-loop, the maximum magnetic field: 15 kOe, the magnetic field step: 40 bits, the time constant of locking amp: 0.3 sec, the waiting time: 1 sec, and the MH average number: 20.

After the M-H loop of the measurement sample (the entire magnetic tape 1) and the M-H loop of the correction sample (base material 41) are obtained, the M-H loop of the correction sample (base material 41) is subtracted from the M-H loop of the measurement sample (the entire magnetic tape 1) to perform background correction, thereby obtaining the M-H loop after background correction. The measurement/analysis program attached to the "VSM-P7-15" is used for this calculation of background correction.

A saturation magnetization Ms (emu) and a residual magnetization Mr (emu) of the obtained M-H loop after background correction are substituted into the following formula to calculate the squareness ratio S1 (%). Note that the measurement of the M-H loop described above is performed at 25° C. Further, the "demagnetizing field correction" in measuring the M-H loop in the perpendicular direction of the magnetic tape 1 is not performed. Note that the measurement/analysis program attached to the "VSM-P7-15" is used for this calculation.

Squareness ratio $S1(\%)=(Mr/Ms)\times 100$

A squareness ratio S2 of the magnetic layer 43 in the longitudinal direction (travelling direction) of the magnetic tape 1 is favorably 35% or less, more favorably 30% or less, still more favorably 25% or less, particularly favorably 20% or less, and most favorably 15% or less. When the squareness ratio S2 is 35% or less, the perpendicular orientation property of the magnetic powder is sufficiently high, and thus, it is possible to achieve more excellent electromagnetic conversion characteristics (e.g., SNR).

The squareness ratio S2 in the longitudinal direction is obtained in a way similar to that for the squareness ratio S1 except for measuring the M-H loop in the longitudinal direction (travelling direction) of the magnetic tape 1 and the base material 41.

(Surface Roughness $R_b$ of Back Surface)

A surface roughness $R_b$ of the back surface (surface roughness of the back layer 44) is favorably $R_b \leq 6.0$ [nm]. When the surface roughness R b of the back surface is within the range described above, it is possible to achieve more excellent electromagnetic conversion characteristics.

[Configuration of Servo Pattern Recording Apparatus]

Subsequently, a configuration of a servo pattern recording apparatus will be described.

As shown in FIG. 3, the magnetic layer 43 includes a plurality of (12 in this embodiment) data bands d (data bands d0 to d11) and a plurality of (13 in this embodiment) servo bands s (servo bands s0 to s12) arranged at positions sandwiching the data bands d in the width direction (Y-axis direction). The data band d includes a plurality of recording tracks 5 long in the longitudinal direction, and data is recorded for each of the recording tracks 5. The servo band s includes the servo pattern 6 that is a predetermined pattern recorded by the servo pattern recording apparatus 100. For example, a recording head of a recording apparatus (not shown) that records various types of data such as electronic data recognizes the position of the recording track 5 by reading the servo pattern 6 recorded in the magnetic layer 4.

With reference to FIG. 1 and FIG. 2, the servo pattern recording apparatus 100 includes a feed roller 11, a pre-processing unit 12, a servo write head 13, a reproduction head unit 14, and a winding roller 15 in the stated order from the upstream side in a conveying direction of the magnetic tape 1. Note that the servo pattern recording apparatus 100 includes a drive unit 20 that drives the servo write head 13, and a controller 30, as described below. The controller 30 includes a control unit that integrally controls the respective units of the servo pattern recording apparatus 100, a recording unit that stores various programs and various types of data required for processing of the control unit, a display unit that displays data, an input unit that inputs data, and the like.

The feed roller 11 is capable of rotatably supporting the magnetic tape 1 having a roll shape (before recording the servo pattern 6). The feed roller 11 is caused to rotate in accordance with driving of the drive source such as a motor and feeds the magnetic tape 1 toward the downstream side in accordance with the rotation.

The winding roller 15 is capable of rotatably supporting the magnetic tape 1 having a roll shape (after recording the servo pattern 6). The winding roller 15 rotates in synchronization with the feed roller 11 in accordance with driving of the drive source such as a motor and winds the magnetic tape 1 in which the servo pattern 6 is recorded in accordance with the rotation. The feed roller 11 and the winding roller 15 are capable of causing the magnetic tape 1 to move at constant speed on the conveying path.

The servo write head 13 is disposed on the upper side (on the side of the magnetic layer 43) of the magnetic tape 1, for example. Note that the servo write head 13 may be disposed on the lower side (on the side of the base material 41) of the magnetic tape 1. The servo write head 13 generates a magnetic field at predetermined timing in accordance with a pulse signal of a square wave and applies the magnetic field to part of the magnetic layer 43 (after the pre-processing) of the magnetic tape 1.

As a result, the servo write head 13 magnetizes part of the magnetic layer 43 in a first direction to record the servo pattern 6 in the magnetic layer 43 (see the black arrow in FIG. 2 for the magnetization direction). The servo write head 13 is capable of recording, when the magnetic layer 43 passes by the lower side of the servo write head 13, the servo pattern 6 in each of the 13 servo bands s0 to s12.

The first direction that is the magnetization direction of the servo pattern 6 includes a perpendicular component perpendicular to the upper surface of the magnetic layer 43. That is, in this embodiment, the magnetic layer 43 includes perpendicularly oriented or non-oriented magnetic powder, and thus, the servo pattern 6 to be recorded in the magnetic layer 43 includes a perpendicular magnetization component.

The pre-processing unit 12 is disposed on the lower side (on the side of the base material 41) of the magnetic tape 1 on the upstream side of the servo write head 13, for example. The pre-processing unit 12 may be disposed on the upper side (on the side of the magnetic layer 43) of the magnetic tape 1. The pre-processing unit 12 includes a permanent magnet 12a rotatable about the Y-axis direction (width direction of the tape 1) as the central axis of rotation. The shape of the permanent magnet 12a is, for example, a columnar shape or a polygonal columnar shape, but is not limited thereto.

The permanent magnet 12a applies, before the servo write head 13 records the servo pattern 6, a magnetic field to the entire magnetic layer 43 by a DC magnetic field to demagnetize the entire magnetic layer 43. As a result, the permanent magnet 12a is capable of magnetizing the magnetic layer 43 in advance in a second direction that is a direction opposite to the magnetization direction of the servo pattern 6 (see the white arrow in FIG. 2). By making the two magnetization directions opposite to each other in this way, it is possible to make the reproduced waveform of the servo signal obtained by reading the servo pattern 6 symmetrical in the vertical direction (±).

The reproduction head unit 14 is disposed on the upper side (on the side of the magnetic layer 43) of the magnetic tape 1 on the downstream side of the servo write head 13. The reproduction head unit 14 reads the servo pattern 6 from the magnetic layer 43 of the magnetic tape 1 that is pre-processed by the pre-processing unit 12, the servo pattern 6 being recorded on the magnetic tape 1 by the servo write head 13. The reproduced waveform of the servo pattern 6 read by the reproduction head unit 14 is displayed on the screen of the display unit. Typically, the reproduction head unit 14 detects magnetic flux generated from the surface of the servo band s when the magnetic layer 43 passes by the lower side of the reproduction head unit 14. The magnetic flux detected at this time is the reproduced waveform of the servo pattern 6 as a servo signal.

[Servo Pattern]

The servo pattern 6 has, for example, a data structure conforming to the "ECMA-319 standard". Part (A) of FIG. 4 is a diagram showing a data structure of an LPOS word embedded in the servo pattern 6, and Part (B) of FIG. 4 is a diagram describing a manufacturer word.

Figure 4:
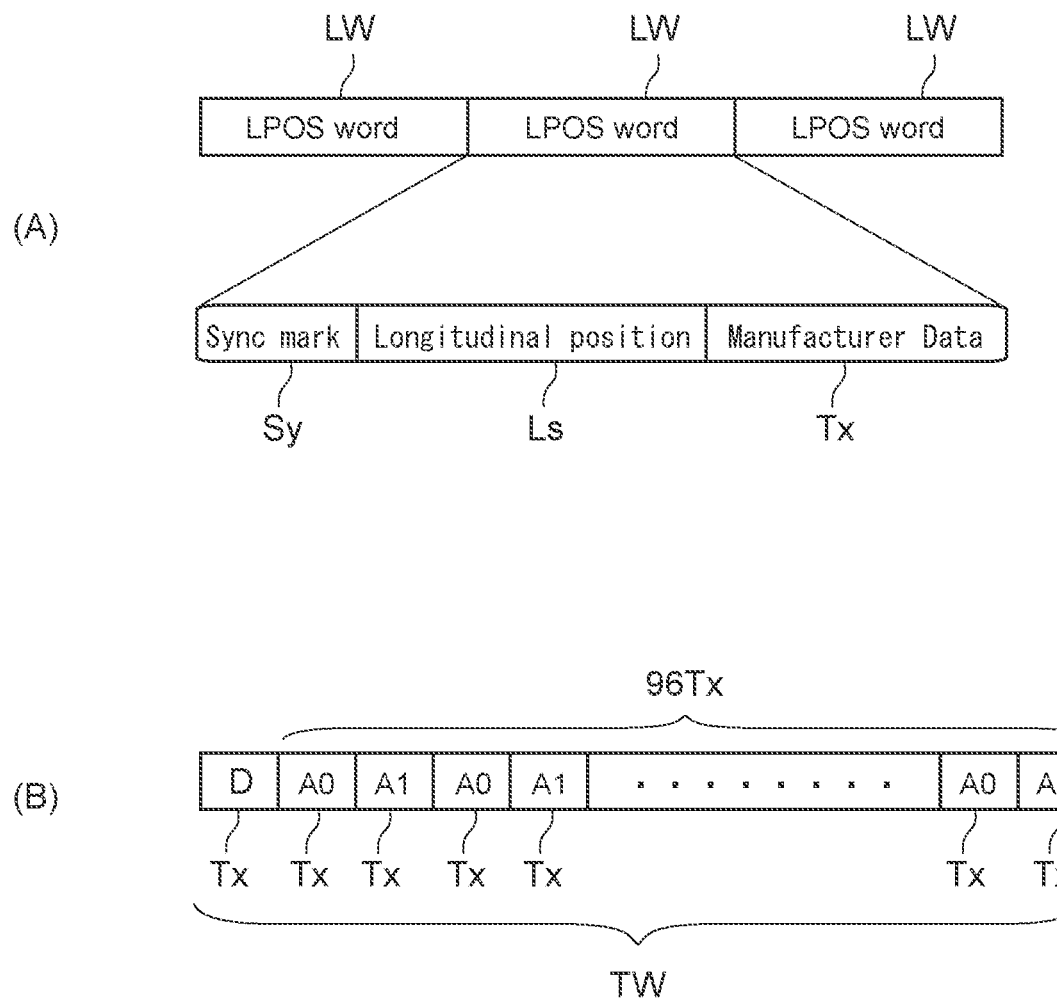
FIG. 4 Part (A) of FIG. 4 is a diagram showing a data structure of an LPOS word embedded in the servo pattern and Part (B) of FIG. 4 is a diagram describing a manufacturer word.

As shown in Part (A) of FIG. 4, a plurality of LPOS (Longitudinal position) words LW continuously arranged in the tape longitudinal direction are embedded in the servo pattern 6. Each of the LPOS words LW includes 36-bit data including an 8-bit synchronization mark Sy meaning the head, six 4-bit LPOS values Ls (total of 24 bits) each indicating the position (address) in the tape longitudinal direction, and 4-bit manufacturer data Tx.

The manufacturer data Tx forms a manufacturer word TW on the magnetic tape 1. As shown in Part (B) of FIG. 4, the manufacturer word TW has a length of 97 pieces of manufacturer data Tx and can be obtained by continuously reading the 97 LPOS words LW. The manufacturer word TW is configured as follows.

Manufacturer word TW: D, A0, A1, A0, A1, . . . , A0, A1

"D" that is the first manufacturer data Tx is a symbol indicating that it is the head of the manufacturer word TW, and 4-bit data (typically, "0001") converted by a predetermined table is written in it.

The second and subsequent 96 pieces of manufacturer data Tx include "A0" and "A1" alternately arranged, and two adjacent "A0" and "A1" form a symbol pair. One of arbitrary 13 basic symbols (typically, 0, 1, 2, 3, 4, 5, 6, 7, 8, 9, A, B, and C) other than "D" is written in each symbol pair "A0" and "A1". Each of the 13 basic symbols also includes 4-bit data converted by the predetermined table described above. Then, one symbol (hereinafter, referred to also as an LPOS recording value) determined in accordance with the combination of specific two basic symbols (corresponding to the symbol pair described above) of the 13 basic symbols is specified.

The LPOS recording value includes 8-bit data. Two basic symbols that form a symbol pair may be a combination of the same symbols (e.g., 0 and 0) or may be a combination of different symbols (e.g., 0 and 1).

Servo band identification information for identifying the servo band, and the like as well as manufacturer information represented by the LPOS recording value and management information such as the date of manufacture and serial number of the magnetic tape are typically embedded in the 96 pieces of manufacturer data Tx configured as described above.

Figure 5:
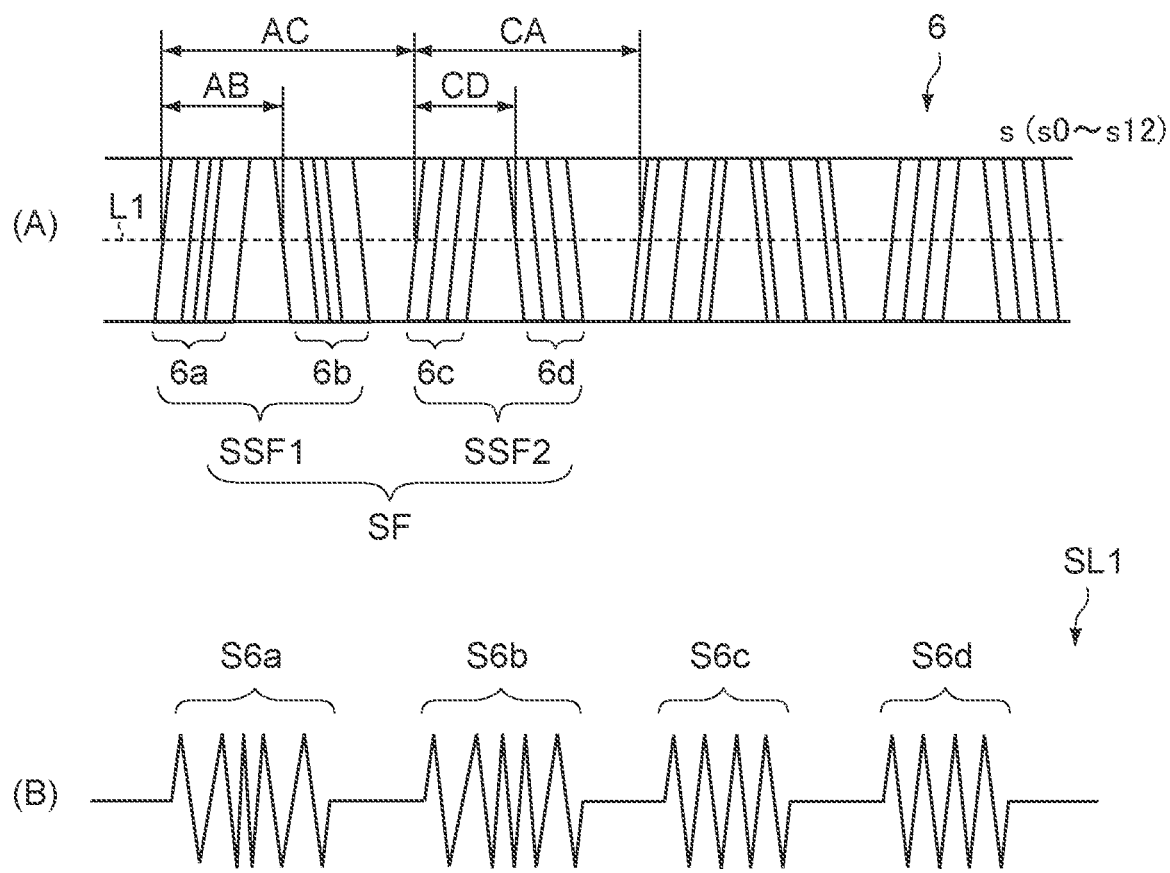
FIG. 5 Part (A) of FIG. 5 is a schematic diagram showing an arrangement example of the servo pattern and Part (B) of FIG. 5 is a diagram showing a reproduced waveform thereof.

Part (A) of FIG. 5 is a schematic plan view showing an arrangement example of the servo pattern 6 and Part (B) of FIG. 5 is a diagram showing the reproduced waveform.

In a timing-based servo type head tracking servo, the servo pattern includes a plurality of azimuthal slope patterns of two or more different shapes. The position of the servo write head is recognized on the basis of the time interval between reading two inclined patterns with different shapes and the time interval between reading two inclined patterns with the same shape. The position of the magnetic head (reproduction head or recording head) in the width direction of the magnetic tape is controlled on the basis of the position of the servo write head thus recognized.

As shown in Part (A) of FIG. 5, the servo pattern 6 forms servo frames SF each including a first servo sub-frame SSF1 and a second servo sub-frame SSF2. The servo frames SF are continuously arranged at predetermined intervals along the tape longitudinal direction. Each of the servo frames SF encodes one bit of "1" or "0". That is, one servo frame SF corresponds to one bit.

The first servo sub-frame SSF1 includes an A burst 6a and a B burst 6b. The A burst 6a includes five linear patterns inclined in the first direction with respect to the tape longitudinal direction, and the B burst 6b includes five linear patterns inclined in the second direction opposite to the first direction with respect to the tape longitudinal direction.

Meanwhile, the second servo sub-frame SSF2 includes a C burst 6c and a D burst 6d. The C burst 6c includes four linear patterns inclined in the first direction described above and the D burst 6d includes four linear patterns inclined in the second direction.

The lengths of the servo frame SF and each of the servo sub-frames SSF1 and SSF2, the arrangement intervals of the inclined portions that inclining the respective bursts 6a to 6d, and the like can be arbitrarily set in accordance with the types, specifications, and the like of the magnetic tape.

The reproduced waveform of the servo pattern 6 typically exhibits a burst waveform as shown in Part (B) of FIG. 5, and a signal S6a, a signal S6b, a signal S6c, and a signal S6d respectively correspond to the A burst 6a, the B burst 6b, the C burst 6c, and the D burst 6d.

In the timing-based servo type head tracking servo, a position error signal (PES) is generated by reading the servo pattern 6 on two servo bands adjacent to one data band, and a recording/reproducing head is suitably positioned with respect to the recording track in the data band. Typically, the servo pattern 6 is read from the magnetic tape travelling at a predetermined speed, a ratio of a distance (time interval) AC between the A burst 6a and the C burst 6c that are an array of inclined patterns having the same shape and a distance (time interval) AB between the A burst 6a and the B burst 6b that are an array of inclined patterns having different shapes (or a ratio of a distance CA between the C burst 6c and the A burst 6a and a distance CD between the C burst 6c and the D burst 6d) is calculated, and the magnetic head is caused to move in the tape width direction such that the value equals to a setting value determined for each recording track.

[Specification of Data Band]

Servo band identification information is written in each of the servo bands s (s0 to s12). The combination of servo band identification information and a phase differs for each data band. Here, as shown in FIG. 3, the respective servo bands s are denoted by s0, s1, . . . , and s12 in order from one edge portion of the magnetic tape 1 (upper edge in the figure) toward the other edge portion (lower edge in the figure).

The same servo band identification information (first servo band identification information) is written in the servo bands s0, s1, and s2, of the servo bands s0 to s12. The end portions of the servo patterns 6 to be recorded in the servo bands s0 and s2 (the writing start position by the servo write head or the reading start position by the servo read head of the drive head unit of the recording/reproduction apparatus. The same applies hereinafter) are aligned with a virtual line P1 parallel to the tape width direction (Y-axis direction). Meanwhile, the end portion of the servo pattern 6 to be recorded in the servo band s1 located between the servo band s0 and the servo band s2 is disposed on a virtual line P2 shifted by a predetermined distance in the tape longitudinal direction from the virtual line P1. Note that in the following description, a position corresponding to the virtual line P1 will be referred to also as a first phase and a position corresponding to the virtual line P2 will be referred to also as a second phase.

The same servo band identification information (second servo band identification information) is written in the servo bands s3, s4, and s5, of the servo bands s0 to s12. The end portions of the servo patterns 6 to be recorded in the servo bands s3 and s5 are aligned with the virtual line P1 (first phase) parallel to the tape width direction (Y-axis direction). Meanwhile, the end portion of the servo pattern 6 to be recorded in the servo band s4 located between the servo band s3 and the servo band s5 is disposed on the virtual line P2 (second phase) shifted by a predetermined distance in the tape longitudinal direction with respect to the virtual line P1.

The same servo band identification information (third servo band identification information) is written in the servo bands s6, s7, and s8, of the servo bands s0 to s12. The end portions of the servo patterns 6 to be recorded in the servo bands s6 and s8 are aligned with the virtual line P1 (first phase) parallel to the tape width direction (Y-axis direction). Meanwhile, the end portion of the servo pattern 6 to be recorded in the servo band s7 located between the servo band s6 and the servo band s8 is disposed on the virtual line P2 (second phase) shifted by a predetermined distance in the tape longitudinal direction with respect to the virtual line P1.

The same servo band identification information (fourth servo band identification information) is written in the servo bands s9, s10, and s11, of the servo bands s0 to s12. The end portions of the servo patterns 10 to be recorded in the servo bands s9 and s11 are aligned with the virtual line P1 (first phase) parallel to the tape width direction (Y-axis direction). Meanwhile, the end portion of the servo pattern 6 to be recorded in the servo band s10 located between the servo band s9 and the servo band s11 is disposed on the virtual line P2 (second phase) shifted by a predetermined distance in the tape longitudinal direction with respect to the virtual line P1.

Servo band identification information (first servo band identification information) is written in the servo band s12, of the servo bands s0 to s12. The end portion of the servo pattern 10 to be recorded in the servo band s12 is aligned with the virtual line P1 (first phase) parallel to the tape width direction (Y-axis direction).

Figure 18:
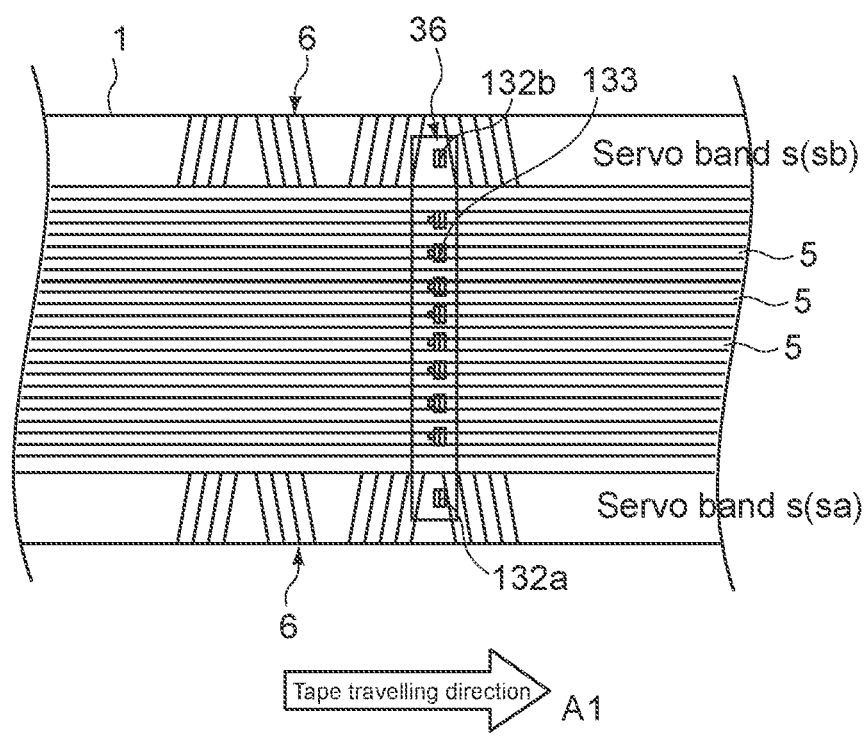
FIG. 18 is an explanatory diagram of the servo read head in a recording/reproduction apparatus.

The drive head unit of the recording/reproduction apparatus will be described with reference to FIG. 18. As shown in FIG. 18, a drive head unit 36 includes a plurality of data write/read heads 133 for recording/reproducing a data signal in the data band (recording track 5) of the magnetic tape 1, and two servo read heads 132a and 132b for reading the servo pattern 6 recorded in the servo band. When the drive head unit 36 records/reproduces a data signal, one servo read head 132a of the two servo read heads 132a and 132b is configured to be positioned on one servo band s (sa) of two adjacent servo bands s and read the servo pattern 6 on this servo band s (sa). Further, the other servo read head 132b of the two servo read heads 132a and 132b is configured to be positioned on the other servo band s (sb) of the two adjacent servo bands s and read the servo pattern 6 on this servo band s (sb).

When specifying the data band, the combination of servo band identification information and a phase in the tape longitudinal direction in two servo bands read by the two servo read heads 132a and 132b attached to the drive head unit 36 of the recording/reproduction apparatus is referred to. Here, the combination of a pair (first pair) of servo band identification information and the phase thereof in one servo band to be read by one servo read head 132a and a pair (second pair) of servo band identification information and the phase thereof in the other servo band to be read by the other servo read head 132b differs across all servo bands and is a unique one associated with the individual data band. Therefore, the data band can be specified by referring to the combinations of pairs of servo band identification information and the phase of two adjacent servo bands.

The combination of servo band identification information and a phase of the two servo bands s0 and s1 adjacent to the data band d11 is (the first servo band identification information and the first phase) and (the first servo band identification information and the second phase).

The combination of servo band identification information and a phase of the two servo bands s1 and s2 adjacent to the data band d9 is (the first servo band identification information and the second phase) and (the first servo band identification information and the first phase).

The combination of servo band identification information and a phase of the two servo bands s2 and s3 adjacent to the data band d7 is (the first servo band identification information and the first phase) and (the second servo band identification information and the first phase).

The combination of servo band identification information and a phase of the two servo bands s3 and s4 adjacent to the data band d5 is (the second servo band identification information and the first phase) and (the second servo band identification information and the second phase).

The combination of servo band identification information and a phase of the two servo bands s4 and s5 adjacent to the data band d3 is (the second servo band identification information and the second phase) and (the second servo band identification information and the first phase).

The combination of servo band identification information and a phase of the two servo bands s5 and s6 adjacent to the data band d1 is (the second servo band identification information and the first phase) and (the third servo band identification information and the first phase).

The combination of servo band identification information and a phase of the two servo bands s6 and s7 adjacent to the data band d0 is (the third servo band identification information and the first phase) and (the third servo band identification information and the second phase).

The combination of servo band identification information and a phase of the two servo bands s7 and s8 adjacent to the data band d2 is (the third servo band identification information and the second phase) and (the third servo band identification information and the first phase).

The combination of servo band identification information and a phase of the two servo bands s8 and s adjacent to the data band d4 is (the third servo band identification information and the first phase) and (the fourth servo band identification information and the first phase).

The combination of servo band identification information and a phase of the two servo bands s9 and s10 adjacent to the data band d6 is (the fourth servo band identification information and the first phase) and (the fourth servo band identification information and the second phase).

The combination of servo band identification information and a phase of the two servo bands s10 and s11 adjacent to the data band d8 is (the fourth servo band identification information and the second phase) and (the fourth servo band identification information and the first phase).

The combination of servo band identification information and a phase of the two servo bands s11 and s12 adjacent to the data band d10 is (the fourth servo band identification information and the first phase) and (the first servo band identification information and the first phase).

As described above, in accordance with this embodiment, in three or more (three in this example) continuous servo bands s in which the same servo band identification information is recorded, the combinations of phases in the longitudinal direction of pieces of servo band identification information to be recorded in two servo bands s adjacent to each other are all different. For example, in the three continuous s0, s1, and s2 in which the first servo band identification information is recorded, the combinations of phases (the first phase, the second phase) and (the second phase, the first phase) of two servo bands (s0, s1) and (s1, s2) adjacent to each other are all different.

Further, the combination of pieces of servo band identification information differs between two servo bands adjacent to each other in which different pieces of servo band identification information are recorded. For example, the combination of pieces of servo band identification information of the two servo bands s2 and s3 is (the first servo band identification information and the second servo band identification information). The combination of pieces of servo band identification information of the two servo bands s5 and s is (the second servo band identification information and the third servo band identification information). The combination of pieces of servo band identification information of the two servo bands s8 and s9 is (the third servo band identification information and the fourth servo band identification information). The combination of pieces of servo band identification information of the two servo bands s11 and s12 is (the fourth servo band identification information and the first servo band identification information). The combinations of pieces of servo band identification information are all different.

As described above, in accordance with this embodiment, in three or more (three in this example) continuous servo bands s in which the same servo band identification information is recorded, the combinations of phases in the longitudinal direction of pieces of servo band identification information to be recorded in two servo bands s adjacent to each other are all different. Further, the combination of pieces of servo band identification information differs between two servo bands adjacent to each other in which different pieces of servo band identification information are recorded. As a result, the combinations of servo band identification information and a phase to be recorded in two servo bands s adjacent to each other are all different. As a result, the individual data band can be specified by making the combination of servo band identification information and a phase obtained from two servo bands s adjacent to one data band d different from servo band identification information obtained from two servo bands adjacent to another data band.

Further, in this embodiment, four types of servo bands are used to specify the data bands d0 to d11 to be recorded and reproduced. As described above, servo band identification information is embedded in the servo band. The servo band identification information is information of a plurality of bits and is embedded at a predetermined position in the second and subsequent 96 pieces of manufacturer data Tx in the manufacturer word TW. The servo band identification information has typically four bits but may have eight bits (combination of the symbol pair "A0" and "A1") or a plurality of bits other than the four bits and eight bits. A case where the servo band identification information has four bits will be described below as an example.

[Servo Band Identification Information]

In this embodiment, the four types of servo bands described above include a first servo band in which the first servo band identification information is recorded, a second servo band in which the second servo band identification information is recorded, a third servo band in which the third servo band identification information is recorded, and a fourth servo band in which the fourth servo band identification information is recorded. The first servo band identification information is 4-bit information (e.g., "1001"). The second servo band identification information is 4-bit information (e.g., "0111") different from the first servo band identification information. The third servo band identification information is 4-bit information (e.g., "0110") different from the first and second servo band identification information. The fourth servo band identification information is 4-bit information (e.g., "0101") different from the first, second, and third servo band identification information.

The combination of codes "0" and "1" forming the first to fourth servo band identification information is identified on the basis of the reproduced waveform of the servo pattern 6. That is, the reproduced waveform of the servo pattern 6 corresponds to the modulation waves of the codes "0" and "1", and the first to fourth servo band identification information is read by demodulating the reproduced waveform and combining four bits, for example. Of the first to fourth servo band identification information, the first and second servo band identification information will be described below as an example with reference to FIG. 7 and FIG. 8.

Figure 7:
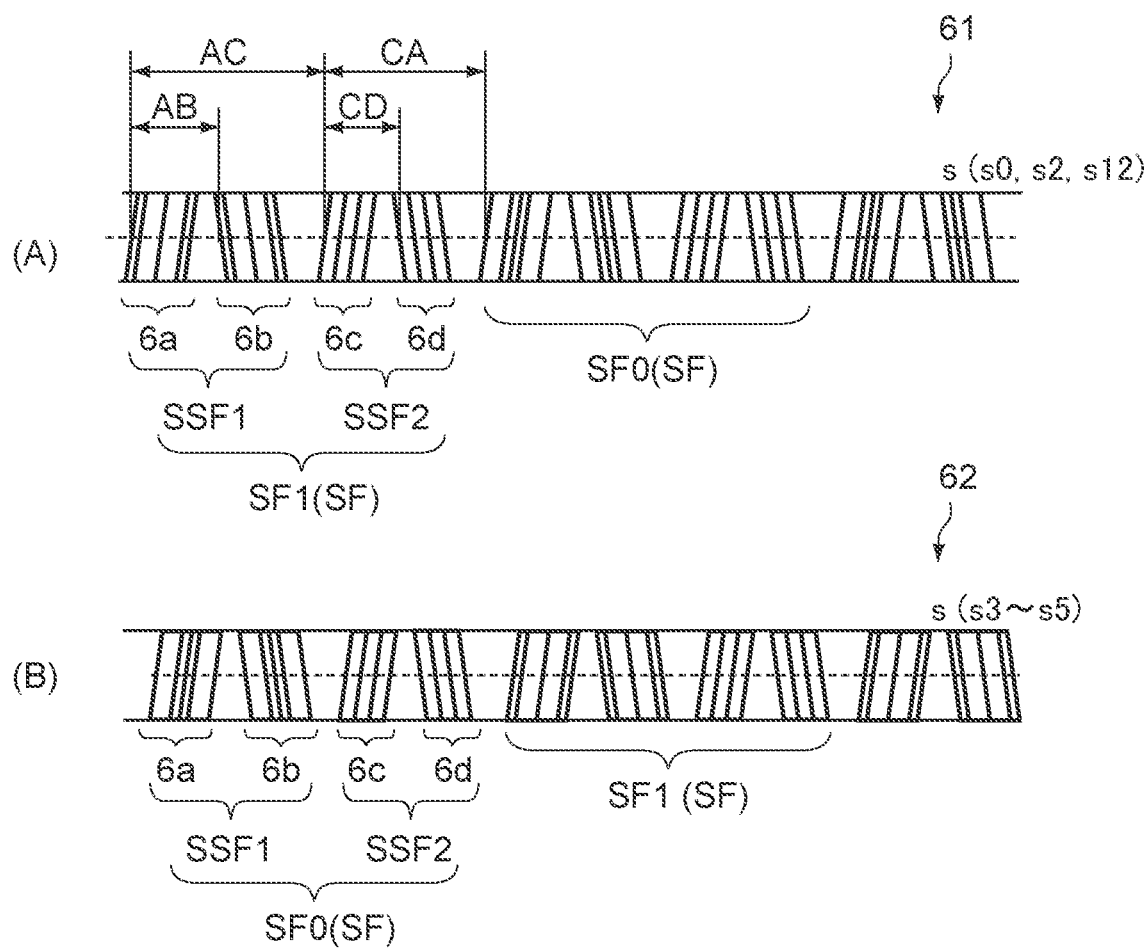
FIG. 7 is a schematic diagram showing a configuration example of first servo band identification information and second servo band identification information.

Parts (A) and (B) of FIG. 7 are each a schematic diagram showing a configuration example of a servo pattern in which the first servo band identification information is embedded (hereinafter, referred to also as a first servo pattern 61) and a servo pattern in which the second servo band identification information is embedded (hereinafter, referred to also as a second servo pattern 62). As shown in the figure, both the first servo pattern 61 and the second servo pattern 62 include a combination of two types of servo frames SF including a servo frame SF1 that represents one code (e.g., "1") and a servo frame SF0 that represents the other code (e.g., "0"). The servo frames SF1 and SF0 are common in that the servo frame SF including the first servo sub-frame SSF1 and the second servo sub-frame SSF2 is a constituent unit, but the first servo sub-frames SSF1 (the A burst 6*a* and the B burst 6*b*) are different from each other. As shown in Part (A) of FIG. 7, when five inclined patterns forming each of the A burst 6*a* and the B burst 6*b* are defined as a first inclined portion, a second inclined portion, a third inclined portion, a fourth inclined portion, and a fifth inclined portion in the stated order from the left side of the figure in the servo frame SF1 representing the code "1", the second and fourth inclined portions are arranged at positions deviated toward the first and fifth inclined portions, respectively. Meanwhile, as shown in Part (B) of FIG. 7, in the servo frame SF0 representing the code "0", the arrangement intervals of some of the inclined patterns forming the A burst 6*a* and the B burst 6*b* are different from those of the servo frame SF1. In the illustrated example, regarding five inclined patterns forming each of the A burst 6*a* and the B burst 6*b*, both the second and fourth inclined portions are arranged at positions deviated toward the third inclined portion. For this reason, regarding the A burst 6*a* and the B burst 6*b* in the servo frame SF0, the interval between the second inclined portion and the third inclined portion and the interval between the third inclined portion and the fourth inclined portion are the shortest, and the interval between the first inclined portion an the second inclined portion and the interval between the fourth inclined portion and the fifth inclined portion are the longest.

Figure 8:
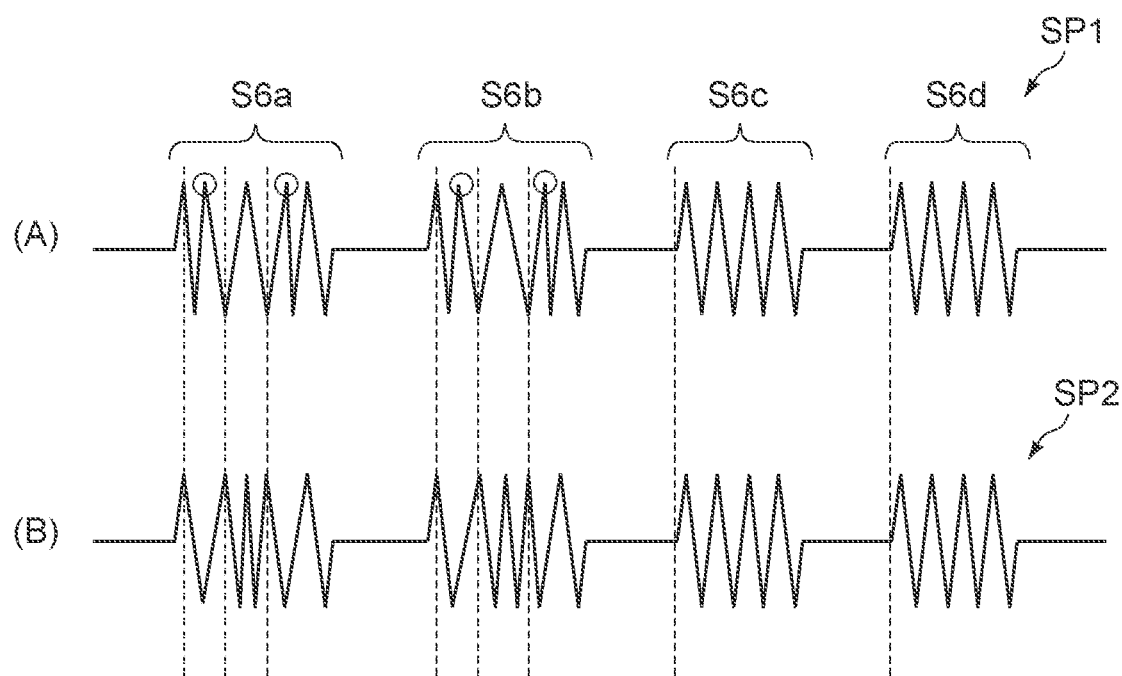
FIG. 8 is a diagram showing reproduced waveform of the first servo band identification information and the second servo band identification information.

Parts (A) and (B) of FIG. 8 respectively show reproduced waveforms SP1 and SP2 of the first servo pattern 61 and the second servo pattern 62. The reproduced waveform of each of the servo frames SF1 and SF0 includes a burst signal having a peak at a position corresponding to the inclined portion of each of the bursts 6*a* to 6*d*. As described above, in the servo frame SF0, since the configurations of the A burst 6*a* and the B burst 6*b* are different from those of the A burst 6*a* and the B burst 6*b* of the servo frame SF1, the peak positions of the burst signals S6*a* and S6*b* are deviated corresponding to the intervals of the different inclined portions. Therefore, information written in the servo frame SF can be read by detecting sites where the peak positions are deviated, the amount of deviation, and the deviation direction. Here, for example, the servo frame SF1 shown in Part (A) of FIG. 8 represents one bit "1", and the servo frame SF0 shown in Part (B) of FIG. 8 represents one bit "0". The first and second servo band identification information can be configured by arbitrarily combining four bits of the two servo frames SF1 and SF0, for example.

In the description above, the recording positions of the second and fourth inclined portions of the A burst and the B burst 6*b* are made different. However, the present technology is not limited thereto, and at least one of the A burst 6*a*, the B burst 6*b*, the C burst 6*c*, or the D burst 6*d* only needs to be made different. Also the inclined portions whose recording positions are made different are not limited to the second and fourth inclined portions. That is, if the arrangement intervals of at least some of two or more different types of azimuthal slopes forming the servo frame SF are different, a bit can be identified. For example, a bit sequence of four bits thereof only needs to be different between the servo frame SF1 and the servo frame SF0.

The angles and arrangement intervals of the azimuthal slope forming the servo frames SF1 and SF0 are not particularly limited and can be arbitrarily set in accordance with the tape width, the number of servo bands, and the like. For example, the distances AB and AC can each be 30 μm or more and 100 μm or less, the inclination angle of each azimuthal slope with respect to the tape width direction can be 6° or more and 25° or less, and the length of each azimuthal slope in the tape width direction can be 30 μm or more and 192 μm or less.

Figure 6:
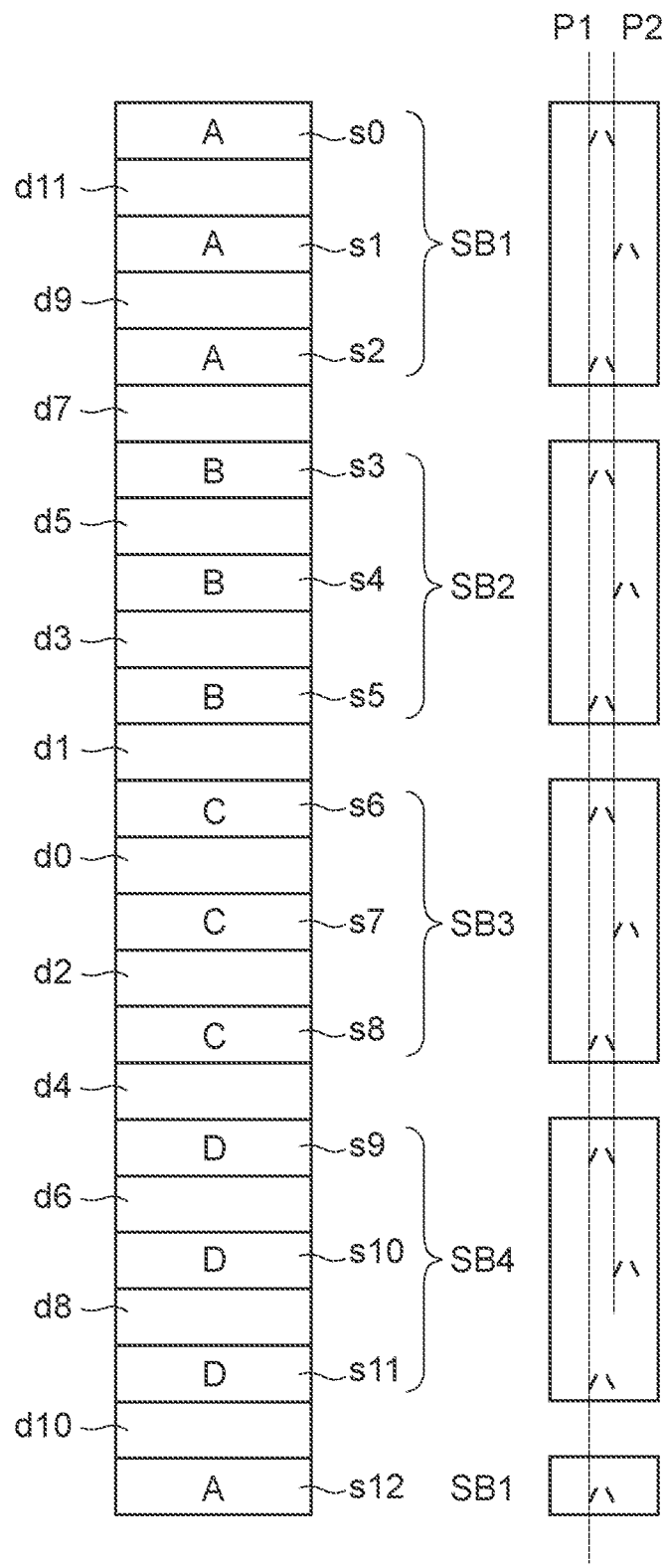
FIG. 6 is a schematic diagram showing an example of assignment of servo bands of 13 ch(channels) and phases.

The magnetic tape 1 according to this embodiment includes three first servo bands A (first servo band group SB1) in which the first servo band identification information is recorded, three second servo bands B (second servo band group SB2) in which the second servo band identification information is recorded, three third servo bands C (third servo band group SB3) in which the third servo band identification information is recorded, three fourth servo bands D (fourth servo band group SB4) in which the fourth servo band identification information is recorded, and one different first servo band A in which the first servo band identification information is recorded (see FIG. 6). In the example shown in FIG. 3, the servo bands s0, s1, and s2 correspond to the first servo bands A, the servo bands s3, s4, and s5 correspond to the second servo bands B, the servo bands s6, s7, and s8 correspond to the third servo bands C, the servo bands s9, s10, and s11 correspond to the fourth servo bands D, and the servo band s12 corresponds to the different first servo band A.

FIG. 6 is a schematic diagram showing assignment of the servo bands A, B, C, and D in the magnetic tape 1 including the servo bands of 13 ch (channels. The number of servo bands) shown in FIG. 3, and the first and the second phases P1 and P2. As shown in the figure, the combinations of the servo bands A, B, C, D adjacent to each other and the phases P1 and P2 respectively correspond to the data bands d11, d9, d7, d5, d3, d1, d0, d2, d4, d6, d8, and d10 as follows. As described below, the combinations of the servo bands A, B, C, and D adjacent to each other and the phases P1 and P2 are all different. That is, the combination of a pair (first pair) of servo band identification information and a phase in one servo band and a pair (second pair) of servo band identification information and a phase in the other servo band, of two servo bands adjacent to each other, is set so as not to overlap as described above.

First pair (A, P1), second pair (A, P2)=d11
First pair (A, P2), second pair (A, P1)=d9
First pair (A, P1), second pair (B, P1)=d7
First pair (B, P1), second pair (B, P2)=d5
First pair (B, P2), second pair (B, P1)=d3
First pair (B, P1), second pair (C, P1)=d1
First pair (C, P1), second pair (C, P2)=d0
First pair (C, P2), second pair (C, P1)=d2
First pair (C, P1), second pair (D, P1)=d4
First pair (D, P1), second pair (D, P2)=d6
First pair (D, P2), second pair (D, P1)=d8
First pair (D, P1), second pair (A, P1)=d10

Figure 9:
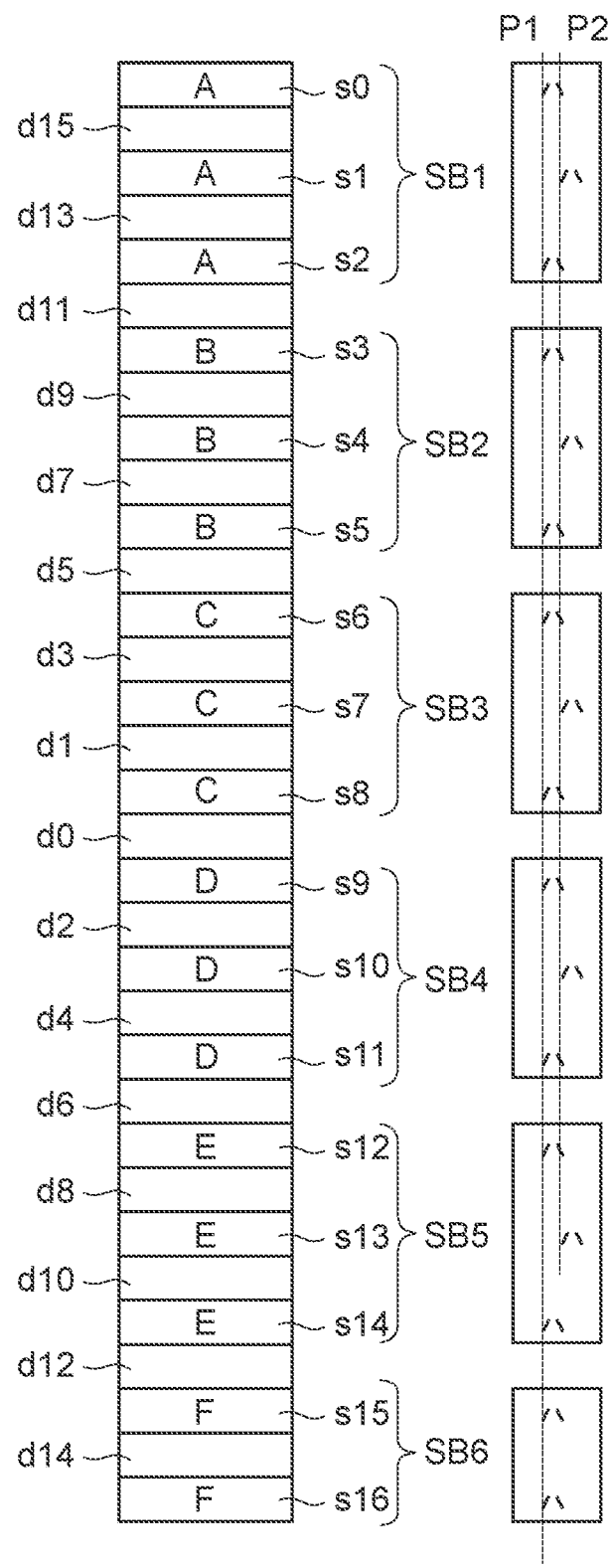
FIG. 9 is a schematic diagram showing an example of assignment of servo bands of 17 ch and phases.

FIG. 9 is a schematic diagram in the case where the magnetic tape 1 includes servo bands of 17 ch according to an Example, which is similar to FIG. 6.

In the case of 17 ch, in addition to the first to fourth servo bands A, B, C, and D, three fifth servo bands E (fifth servo band group SB5) and two sixth servo bands F (sixth servo band group SB6) in which servo band identification information different from those of the first to fourth servo bands A, B, C, and D is recorded. In the fifth servo band E, a fifth servo pattern including 4-bit information (e.g., "0100") different from the first to fourth servo band identification information is recorded as fifth servo band identification information. In the sixth servo band F, a sixth servo pattern including 4-bit information different from the first to fifth servo band identification information is recorded as sixth servo band identification information. The fifth and sixth servo band identification information can be arbitrarily set by making the combination of the servo frame SF1 and the servo frame SF0 different from those of the first to fourth servo band identification information. Also in the case of the magnetic tape 1 including servo bands of 17 ch, the combinations of the servo bands A, B, C, D, E, and F adjacent to each other and the phases P1 and P2 are all different as follows.

First pair (A, P1), second pair (A, P2)=d15
First pair (A, P2), second pair (A, P1)=d13
First pair (A, P1), second pair (B, P1)=d11
First pair (B, P1), second pair (B, P2)=d9
First pair (B, P2), second pair (B, P1)=d7
First pair (B, P1), second pair (C, P1)=d5
First pair (C, P1), second pair (C, P2)=d3
First pair (C, P2), second pair (C, P1)=d1
First pair (C, P1), second pair (D, P1)=d0
First pair (D, P1), second pair (D, P2)=d2
First pair (D, P2), second pair (D, P1)=d4
First pair (D, P1), second pair (E, P1)=d6
First pair (E, P1), second pair (E, P2)=d8
First pair (E, P2), second pair (E, P1)=d10
First pair (E, P1), second pair (F, P1)=d12
First pair (F, P1), second pair (F, P1)=d14

Figure 10A:
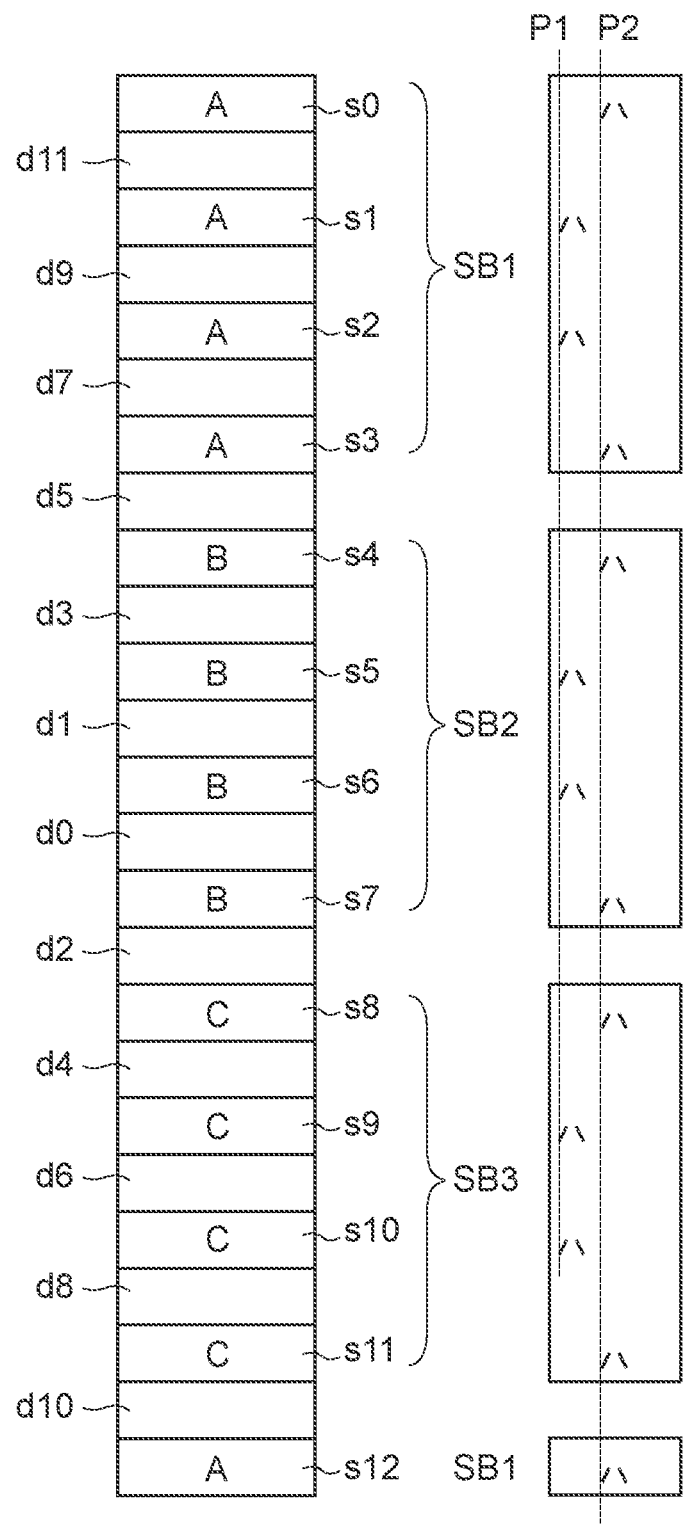
FIG. 10A is a schematic diagram showing an example of assignment of servo bands of 13 ch and phases according to another Example.

FIG. 10A is a schematic diagram in the case where the magnetic tape 1 includes servo bands of 13 ch according to another Example, which is similar to FIG. 6.

This Example has 13ch as in FIG. 6. The difference from FIG. 6 is that not three but four servo bands in which the same servo band identification information is recorded are continuous. For example, four first servo bands A in which the same first servo band identification information is recorded are continuous. As a result, even with the same 13 ch, the fourth servo band D is unnecessary and the first to third servo bands A, B, and C are sufficient. Also in this case, the combinations of the servo bands A, B, and C adjacent to each other and the phases P1 and P2 are all different as follows.

First pair (A, P2), second pair (A, P1)=d11
First pair (A, P1), second pair (A, P1)=d9
First pair (A, P1), second pair (A, P2)=d7
First pair (A, P2), second pair (B, P2)=d5
First pair (B, P2), second pair (B, P1)=d3
First pair (B, P1), second pair (B, P1)=d1
First pair (B, P1), second pair (B, P2)=d0
First pair (B, P2), second pair (C, P2)=d2
First pair (C, P2), second pair (C, P1)=d4
First pair (C, P1), second pair (C, P1)=d6
First pair (C, P1), second pair (C, P2)=d8
First pair (C, P2), second pair (A, P2)=d10

Figure 10B:
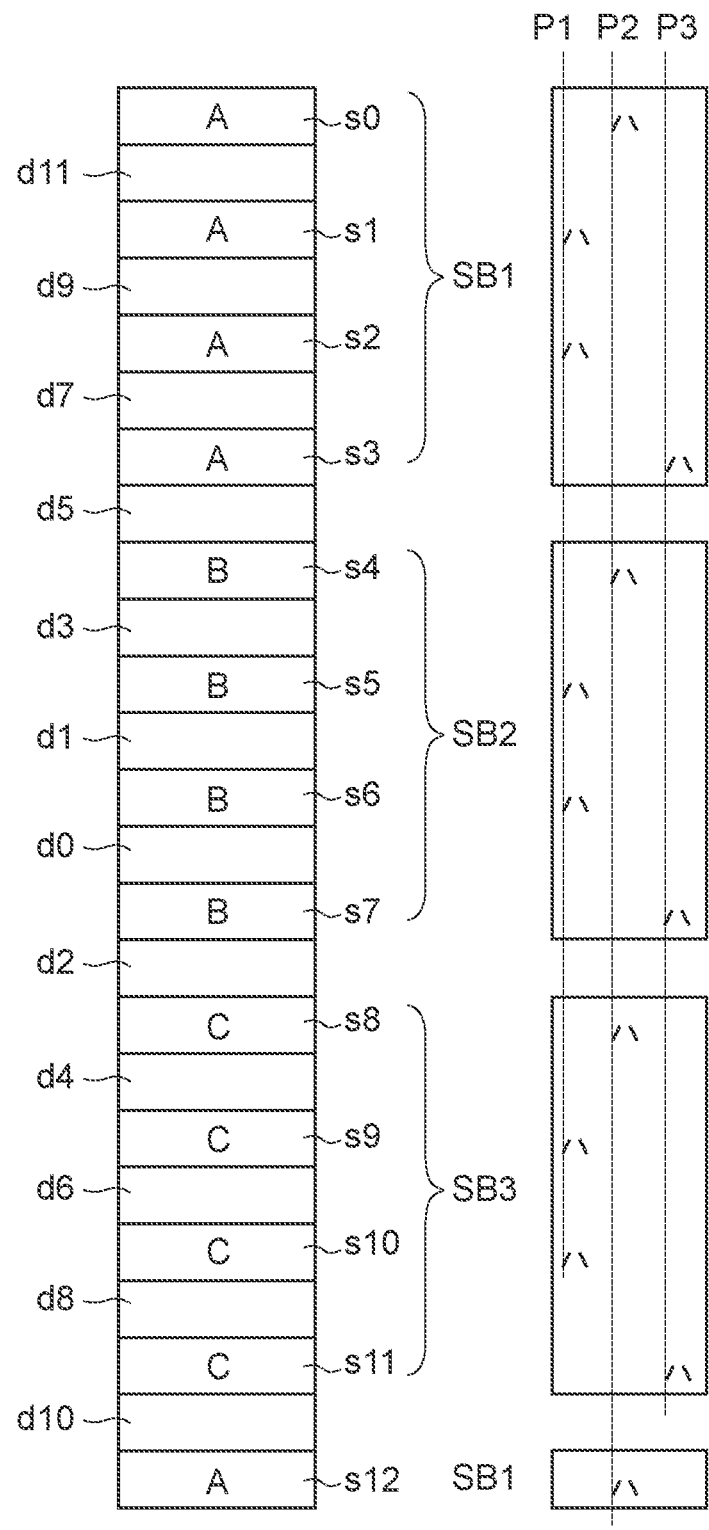
FIG. 10B is a schematic diagram showing an example of assignment of servo bands of 13 ch and phases according to another Example.

FIG. 10B is a schematic diagram in the case where the magnetic tape 1 includes servo bands of 13 ch according to another Example, which is similar to FIG. 6.

This Example has 13ch as in FIG. 10A. As in FIG. 10A, not three but four servo bands in which the same servo band identification information is recorded are continuous. The difference from FIG. 10A is that there are three types of phases P1, P2, and P3. Also in this case, the combinations of the servo bands A, B, and C adjacent to each other and the phases P1, P2, and P3 are all different as follows.

First pair (A, P2), second pair (A, Pb)=d11
First pair (A, P1), second pair (A, Pb)=d9
First pair (A, P1), second pair (A, P3)=d7
First pair (A, P3), second pair (B, P2)=d5
First pair (B, P2), second pair (B, Pb)=d3
First pair (B, P1), second pair (B, Pb)=d1
First pair (B, P1), second pair (B, P3)=d0
First pair (B, P3), second pair (C, P2)=d2
First pair (C, P2), second pair (C, P1)=d4
First pair (C, P1), second pair (C, P1)=d6
First pair (C, P1), second pair (C, P3)=d8
First pair (C, P3), second pair (A, P2)=d10

Figure 10C:
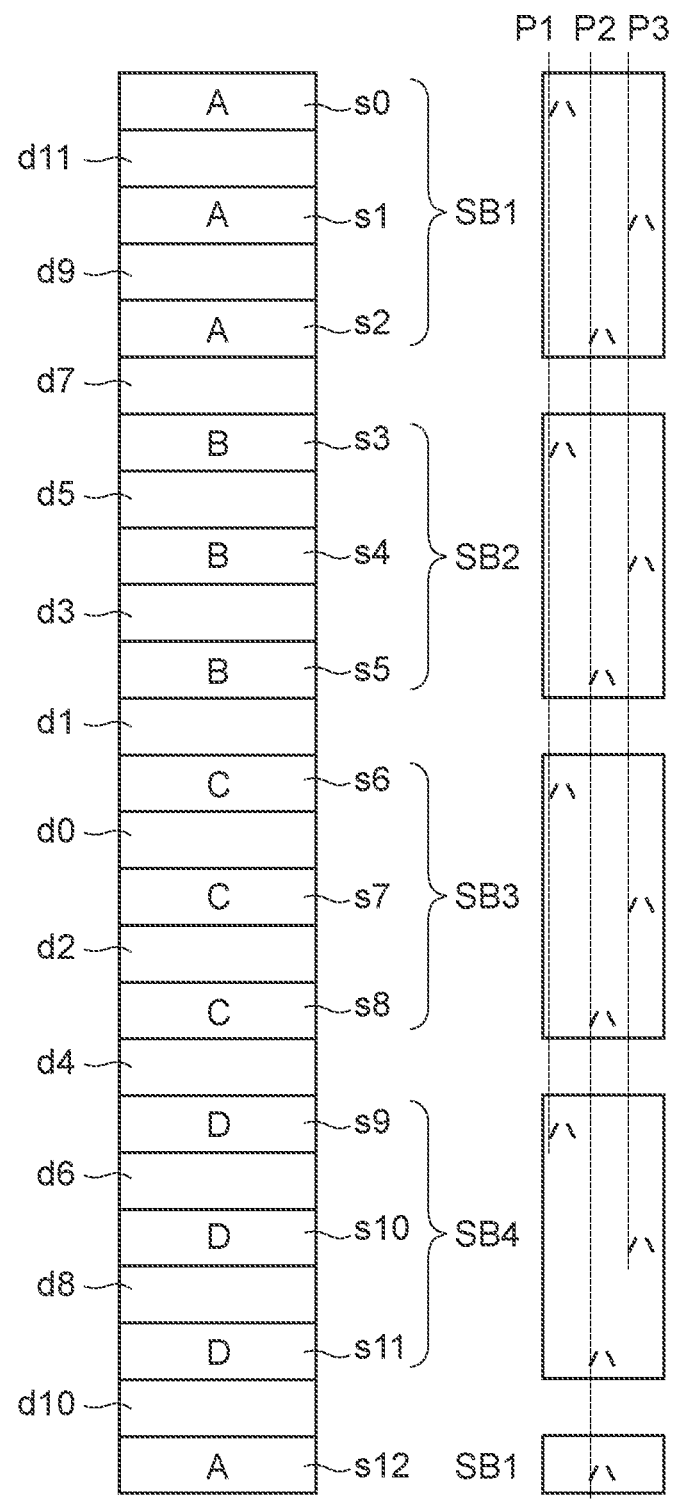
FIG. 10C is a schematic diagram showing an example of assignment of servo bands of 13 ch and phases according to another Example.

FIG. 10C is a schematic diagram in the case where the magnetic tape 1 includes servo bands of 13 ch according to another Example, which is similar to FIG. 6.

This Example has 13 ch as in FIG. 6. As in FIG. 6, three servo bands in which the same servo band identification information is recorded are continuous. The difference from FIG. 6 is that there are three types of phases P1, P2, and P3. The phase P3 is set at a position shifted by a predetermined amount in the tape longitudinal direction to the opposite side of the phase P1 with respect to the phase P2. Also in this case, the combinations of the servo bands A, B, C, and D adjacent to each other and the phases P1, P2, and P3 are all different as follows.

First pair (A, P1), second pair (A, P3)=d11
First pair (A, P3), second pair (A, P2)=d9
First pair (A, P2), second pair (B, P1)=d7
First pair (B, P1), second pair (B, P3)=d5
First pair (B, P3), second pair (B, P2)=d3
First pair (B, P2), second pair (C, P1)=d1
First pair (C, P1), second pair (C, P3)=d0
First pair (C, P3), second pair (C, P2)=d2
First pair (C, P2), second pair (D, P1)=d4
First pair (D, P1), second pair (D, P3)=d6
First pair (D, P3), second pair (D, P2)=d8
First pair (D, P2), second pair (A, P2)=d10

Assignment examples of the first to sixth servo bands A to F are not limited to the examples shown in FIG. 9, FIG. 10A, FIG. 10B, and FIG. 10C. For example, in the case of 13 ch, the servo bands may be AAAABBBBCCCCB unlike FIG. 10A and FIG. 10B instead of AAAABBBBCCCCA from the top in the figure.

As is clear from the examples of FIG. 6, FIG. 9, FIG. 10A, FIG. 10B, and FIG. 10C, in accordance with this embodiment, the sufficient number of pieces of servo band identification information is less than half the number of servo bands ((number of servo bands/2)−1). The number of pieces of servo band identification information is, for example, 3 (FIG. 10A and FIG. 10B) or 4 (FIG. 6 and FIG. 10C) in the case of 13 ch and is, for example, 6 (FIG. 9) in the case of 17 ch.

As described above, the magnetic tape 1 according to this embodiment includes at least three or more continuous first servo bands A in which the first servo band identification information is recorded and three or more continuous second servo bands B in which the second servo band identification information is recorded. The combinations of the phases P in the longitudinal direction of the first servo band identification information recorded in two adjacent first servo bands A included in the three or more continuous first servo bands A are all different. The combinations of the phases P in the longitudinal direction of the second servo band identification information recorded in two adjacent second servo bands B included in the three or more continuous second servo bands B are all different. As a result, the combinations of the servo bands s adjacent to each other and the phases P are all different. As a result, the magnetic tape 1 according to this embodiment is configured such that the data band d can be specified on the basis of the difference in the combination of the servo band identification information and the phase P of the pair of servo bands s sandwiching the data band d. As a result, an increase in servo band identification information due to an increase in number of data bands can be suppressed and an increase in number of data bands can be easily coped with. Further, since it is unnecessary to add unique servo band identification information to individual servo bands, an increase in types of servo band identification information can be suppressed and assignment of the servo band identification information to each servo band can be easily performed.

[Details of Servo Pattern Recording Apparatus]

Figure 11:
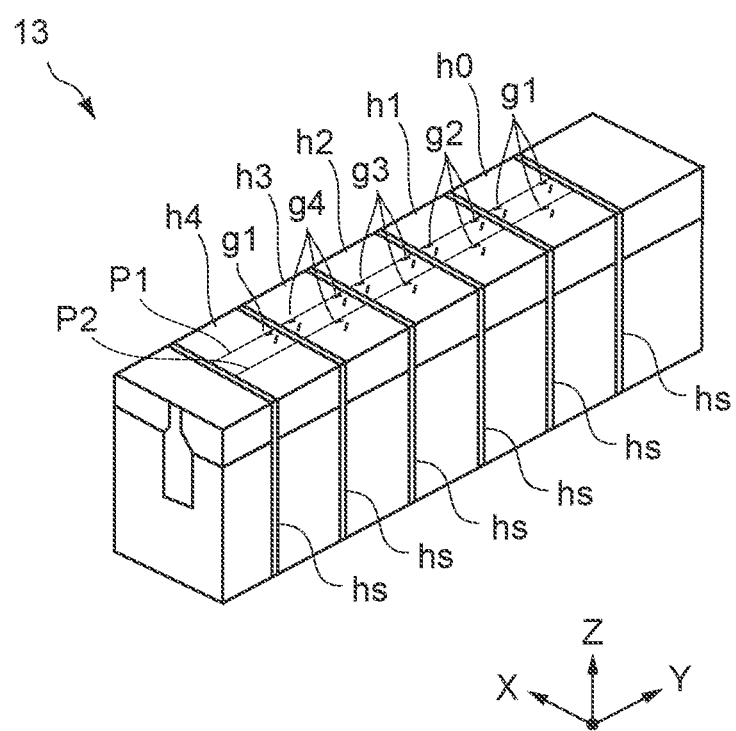
FIG. 11 is a perspective view schematically showing a configuration of a servo write head in the servo pattern recording apparatus.
Figure 12:
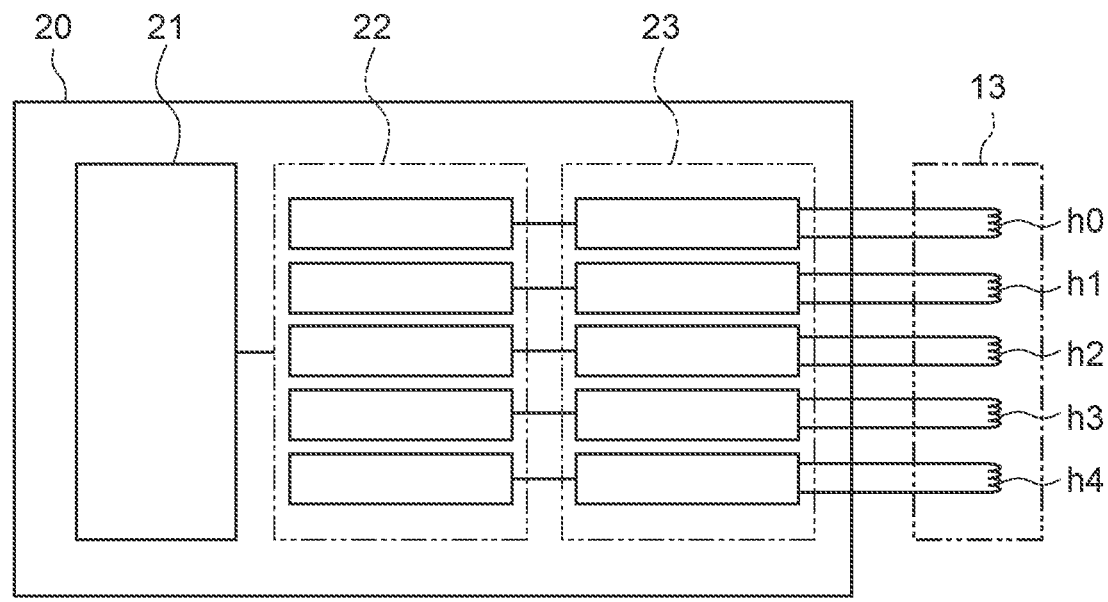
FIG. 12 is a block diagram showing a configuration of a drive unit that drives the servo write head.

Subsequently, details of the servo pattern recording apparatus 100 will be described.

as shown in FIG. 1, the servo pattern recording apparatus 100 includes the drive unit 20 that drives the servo write head 13. FIG. 11 is a perspective view schematically showing a configuration of the servo write head 13, and FIG. 12 is a block diagram showing a configuration of the drive unit 20.

As shown in FIG. 11, the servo write head 13 includes a plurality of head blocks h0 to h4 for recording the servo pattern 6 in each of the servo bands s0 to s12 of the magnetic tape 1 (FIG. 3 and FIG. 6). The head blocks h0 to h4 are joined to each other via an adhesive layer hs.

The first head block h0 includes three first magnetic gaps g1 that are arranged corresponding to the three continuous first servo bands s0, s1, and s2 (A in FIG. 6) of the magnetic tape 1 and for recording the first servo pattern in the first servo bands s0, s1, and s2. The three first magnetic gaps g1 are arranged such that the combinations of the phases P1 and P2 in the longitudinal direction (X direction) of two adjacent first magnetic gaps g1 included in the three first magnetic gaps g1 are all different.

The second head block h1 includes three second magnetic gaps g2 that are arranged corresponding to the three continuous second servo bands s3, s4, and s5 (B in FIG. 6) of the magnetic tape 1 and for recording the second servo pattern in the second servo bands s3, s4, and s5. The three second magnetic gaps g2 are arranged such that the combinations of the phases P1 and P2 in the longitudinal direction (X direction) of two adjacent second magnetic gaps g2 included in the three second magnetic gaps g2 are all different.

The third head block h2 includes three third magnetic gaps g3 that are arranged corresponding to the three continuous third servo bands s6, s7, and s8 (C in FIG. 6) of the magnetic tape 1 and for recording a third servo pattern in the third servo bands s6, s7, and s8. The three third magnetic gaps g3 are arranged such that the combinations of the phases P1 and P2 in the longitudinal direction (X direction) of two adjacent third magnetic gaps g3 included in the three third magnetic gaps g3 are all different.

The fourth head block h3 includes three fourth magnetic gaps g4 that are arranged corresponding to the three continuous fourth servo bands s9, s10, and s11 (D in FIG. 6) of the magnetic tape 1 and for recording a fourth servo pattern in the fourth servo bands s9, s10, and s11. The three fourth magnetic gaps g4 are arranged such that the combinations of the phases P1 and P2 in the longitudinal direction (X direction) of two adjacent fourth magnetic gaps g4 included in the three fourth magnetic gaps g4 are all different.

The different first head block h4 includes one first magnetic gap g1 that id disposed corresponding to one different first servo band s12 (A in FIG. 6) of the magnetic tape 1 and for recording the first servo pattern in the first servo band s12.

The magnetic gap g includes a pair of straight portions ("/" and "Y") inclined in direction opposite to each other. One linear portion "/" records the A burst 6a and the C burst 6c, and the other linear portion "Y" records the B burst 6b and the D burst 6d. The magnetic gaps g of the head blocks h0 to h4 are arranged so as to be aligned on axis lines P1 and P2 parallel to the longitudinal direction of the servo write head 13. The head blocks h0 to h4 are magnetically separated from each other and are configured to be capable of recording different types of servo patterns in two or more servo bands at the same timing.

The drive unit 20 includes a converter 21 that converts, on the basis of the output from the controller 30 (see FIG. 1), servo information into pulse information, a signal generation unit 22 that generates a pulse signal on the basis of the output of the converter 21, and an amplifier 23 that amplifies the generated pulse signal. The signal generation unit 22 and the amplifier 23 respectively include signal generation units 22 and amplifiers 23 provided corresponding to the respective head blocks h0 to h4 and are configured to be capable of outputting a unique pulse signal to the respective head blocks h0 to h4.

The controller 30 includes a memory storing data regarding the position (s0, s1, s2 in this example) of the first servo band in which the first servo band identification information is to be recorded, the position (s3, s4, s5 in this example) of the second servo band in which the second servo band identification information is to be recorded, the position (s6, s7, s8 in this example) of the third servo band in which the third servo band identification information is to be recorded, the position (s9, s10, s11 in this example) of the fourth servo band in which the fourth servo band identification information is to be recorded, and the position (s12 in this example) of the different first servo band in which the first servo band identification information is to be recorded. The controller 30 controls the drive unit 20 on the basis of the data stored in the memory.

The converter 21 individually outputs information corresponding to the servo band identification information to be recorded in the respective servo bands s0 to s12 to the signal generation units 22 corresponding to the head blocks h0 to h4. In this embodiment, the converter 21 outputs a first pulse signal PS1 (first recording signal) for recording the first servo pattern 61 (Part (A) of FIG. 7) including the first servo band identification information to the first head blocks h0 and h4 corresponding to the first servo bands s0, s1, s2, and s12. The converter 21 outputs a second pulse signal PS2 (second recording signal) for recording the second servo pattern 62 (Pattern (B) of FIG. 7) including the second servo band identification information to the second head block h1 corresponding to the second servo bands s3, s4, and s5. The converter 21 outputs a third pulse signal (third recording signal) for recording the third servo pattern (FIG. 3) including the third servo band identification information to the third head block h2 corresponding to the third servo bands s6, s7, and s8. The converter 21 outputs a fourth pulse signal (fourth recording signal) for recording the fourth servo pattern (FIG. 3) including the fourth servo band identification information to the fourth head block h3 corresponding to the fourth servo bands s9, s10, and s11. Of the first to fourth pulse signals, the first and second pulse signals will be described below as an example with reference to Parts (A) and (B) of FIG. 13.

Figure 13:
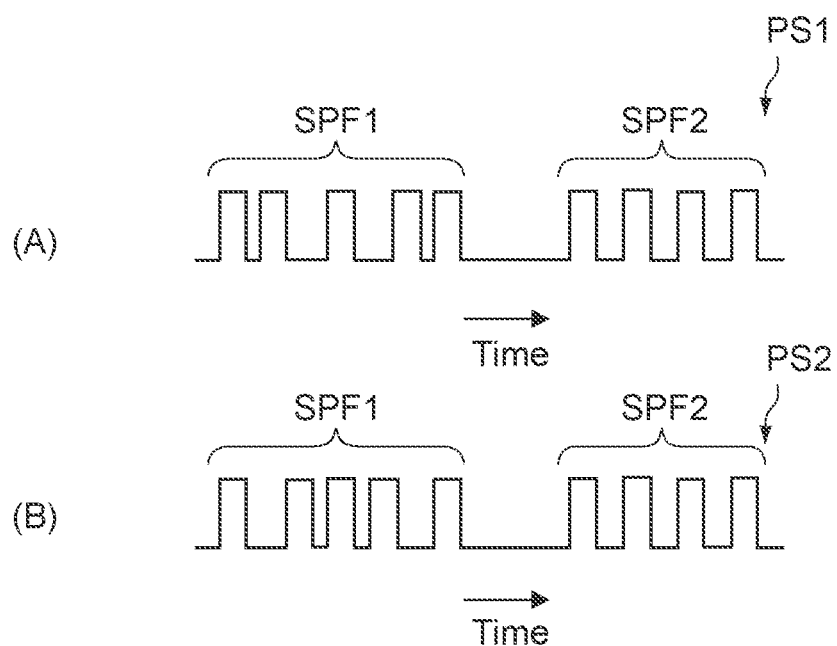
FIG. 13 is a schematic diagram showing part of waveforms of a first pulse signal and a second pulse signal input to the servo write head.

Parts (A) and (B) of FIG. 13 schematically show recording signal waveforms of the first servo sub-frame SSF1 in the first pulse signal PS1 and the second pulse signal PS2, respectively. As shown in the figure, the first and second pulse signals PS1 and PS2 each include a first pulse group SPF1 including five pulse groups and a second pulse group SPF2 including four pulse groups. The first pulse group SPF1 is a signal for recording the respective inclined portions of the A burst 6a, and the second pulse group SPF2 is a signal for recording the respective inclined portions of the B burst 6b.

As shown in the figure, the second and fourth pulse rise times in the first pulse group SPF1 are different between the first pulse signal PS1 and the second pulse signal PS2. The second pulse rise time of the pulse signal PS2 is later than that of the pulse signal PS1, and the fourth pulse rise times of the pulse signal PS2 is earlier than that of the pulse signal PS1. As a result, the first servo sub-frames SSF1 in which some of the arrangement intervals of the inclined portions of the A bursts 6a are different from each other as shown in Parts (A) and (B) of FIG. 7 are formed. When comparing a plurality of servo frames that encodes the first servo band identification information to the fourth servo band identification information with each other, some of the arrangement intervals of at least one of the two or more different types of azimuthal slopes are different from each other.

Further, the first pulse signal PS1 and the second pulse signal PS2 are respectively transmitted to the head blocks h0 and h4 and the head block h1 at the same timing. As a result, in the respective head blocks h0, h1, and h4, the first servo pattern 61 (first servo band identification information) and the second servo pattern 62 (second servo band identification information) are respectively recorded in the first servo bands s0, s1, s2, and s12 and the second servo bands s3, s4, and s5 at the same timing.

Although the first and second pulse signals have been described above as examples, the same applies to the third and fourth pulse signals. That is, the rise times of some pules of the third pulse signal are different from the rise times of the pulses of the first, second, and fourth pulse signals. The rise times of some pules of the fourth pulse signal are different from the rise times of the pulses of the first, second, and the third pulse signals. The first to fourth pulse signals are transmitted to the respective head blocks h0 to h4 at the same timing. As a result, in the respective head blocks h0 to h4, the first to fourth servo patterns (servo band identification information) are recorded in the first to fourth servo bands s0 to s12 at the same timing.

As shown in FIG. 11, in the first head block h0, the three first magnetic gaps g1 are arranged such that the combinations of the phases P1 and P2 in the longitudinal direction (X direction) of two adjacent first magnetic gaps g1 included in the three first magnetic gaps g1 are all different. In the second head block h1, the three second magnetic gaps g2 are arranged such that the combinations of the phases P1 and P2 in the longitudinal direction (X direction) of two adjacent second magnetic gaps g2 included in the three second magnetic gaps g2 are all different. In the third head block h2, the three third magnetic gaps g3 are arranged such that the combinations of the phases P1 and P2 in the longitudinal direction (X direction) of two adjacent third magnetic gaps g3 included in the three third magnetic gaps g3 are all different. In the fourth head block h3, the three fourth magnetic gaps g4 are arranged such that the combinations of the phases P1 and P2 in the longitudinal direction (X direction) of two adjacent fourth magnetic gaps g4 included in the three fourth magnetic gaps g4 are all different.

For this reason, in the case where the first to fourth pulse signals are transmitted to coils wound around the respective head blocks h0 to h4 at the same timing, the head blocks h0 to h4 are magnetized by the induced magnetic field at the same timing. When focusing on the first head block h0, leakage magnetic fields are generated at the same timing from the three first magnetic gaps g1 formed in the magnetized head block h0. Since the phases P1 and P2 in the longitudinal direction (X direction) are different between the three first magnetic gaps g1, the first servo pattern 61 (first servo band identification information) is recorded in the servo bands s0, s1, and s2 at the same timing with the different phases P1 and P2. The same applies to the other head blocks h1 to h4. That is, leakage magnetic fields are generated at the same timing from the 13 magnetic gaps g1 to g4 formed in the magnetized head blocks h0 to h4. Since the phases P1 and P2 in the longitudinal direction (X direction) are different between the 13 magnetic gaps g1 to g4, the first to fourth servo patterns (first to fourth servo band identification information) are recorded at the same timing in the servo bands s0 to s12 with the different phases P1 and P2.

Figure 14:
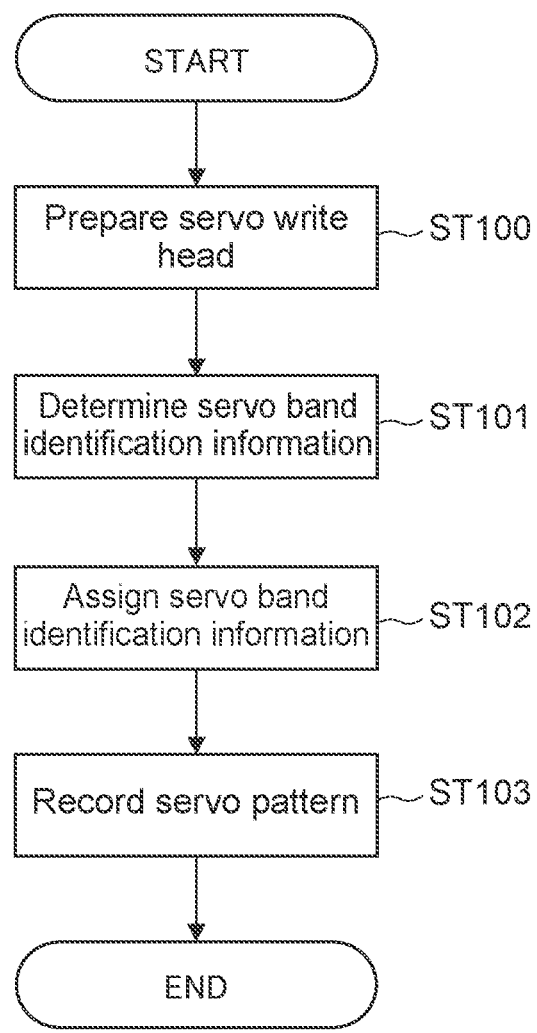
FIG. 14 is a flowchart describing a servo pattern recording method according to an embodiment of the present technology.

FIG. 14 is a flowchart describing the servo pattern recording method described above.

First, the servo write head 13 is prepared (ST100). The servo write head 13 includes the plurality of head blocks h0 to h4. Each of the head blocks h0 to h4 includes three or more magnetic gaps g. The three or more magnetic gaps g are arranged such that the combinations of the phases P1 and P2 in the longitudinal direction (X direction) of two adjacent magnetic gaps g included in the three or more magnetic gaps g are all different.

A servo pattern corresponding to the number of servo bands (number of ch) and the number of head blocks h is determined (ST101). In this embodiment, since a servo pattern is recorded in the magnetic tape 1 including the servo bands s0 to s12 of 13 ch by using the servo write head 13 including the five head blocks h0 to h4, four types of servo patterns (first to fourth servo patterns) with different pieces of servo band identification information are determined. The determination of a servo pattern is input via, for example, the input unit included in the controller 30 and stored in the memory described above.

Subsequently, three or more continuous first to fourth servo bands A to D in which the first to fourth servo band identification information is recorded are determined (ST102). In this embodiment, as described above, the servo bands s0, s1, s2, and s12 are determined as the first servo bands A, the servo bands s3, s4, and s5 are determined as the second servo bands B, the servo bands s6, s7, and s8 are determined as the third servo bands C, and the servo bands s9, s10, and s11 are determined as the fourth servo bands D. The determination of each of the servo bands A to D is input via, for example, the input unit included in the controller 30.

Subsequently, when the drive unit 20 inputs the first to fourth pulse signals to the servo write head 13 at the same timing, the first to fourth servo patterns including the first to fourth servo band identification information are recorded in the first to fourth servo bands A to D (ST103). As descried above, since the phases P1 and P2 in the longitudinal direction (X direction) are different between the 13 magnetic gaps g1 to g4 included in the respective head blocks h0 to h4, the first to fourth servo patterns (first to fourth servo band identification information) are recorded at the same timing in the servo bands s0 to s12 with the different phases P1 and P2. As a result, the magnetic tape 1 shown in FIG. 3 is prepared.

[Servo Write Head]

Figure 15:
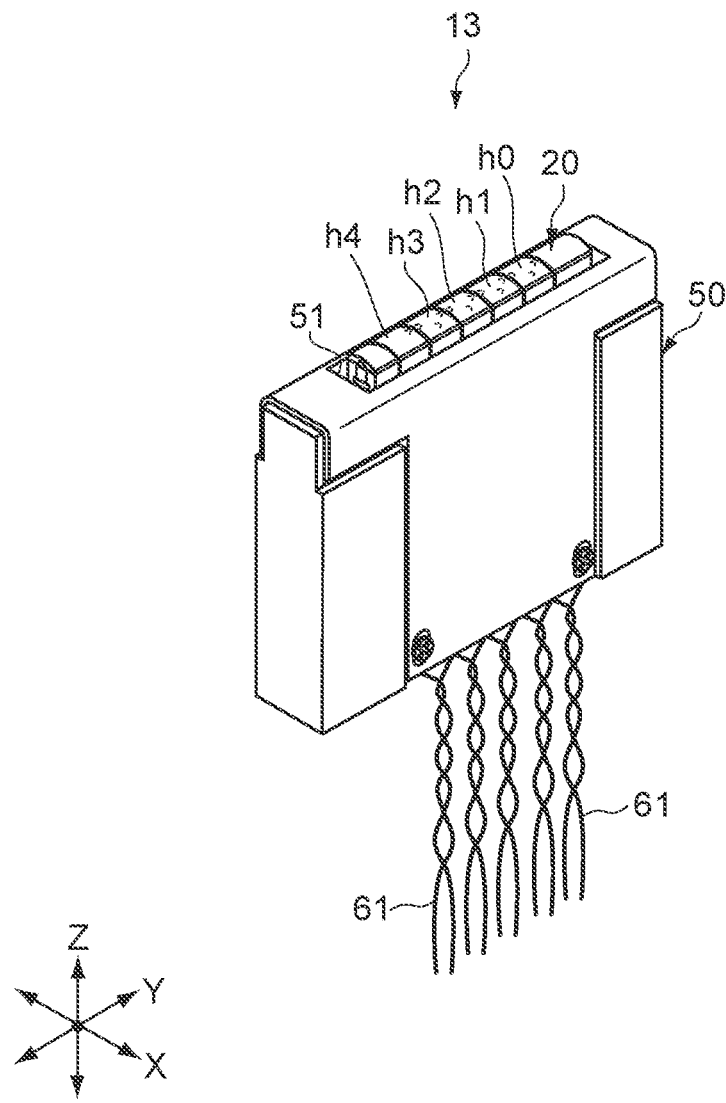
FIG. 15 is a perspective view of the servo write head when viewed from the side of the magnetic tape.
Figure 16:
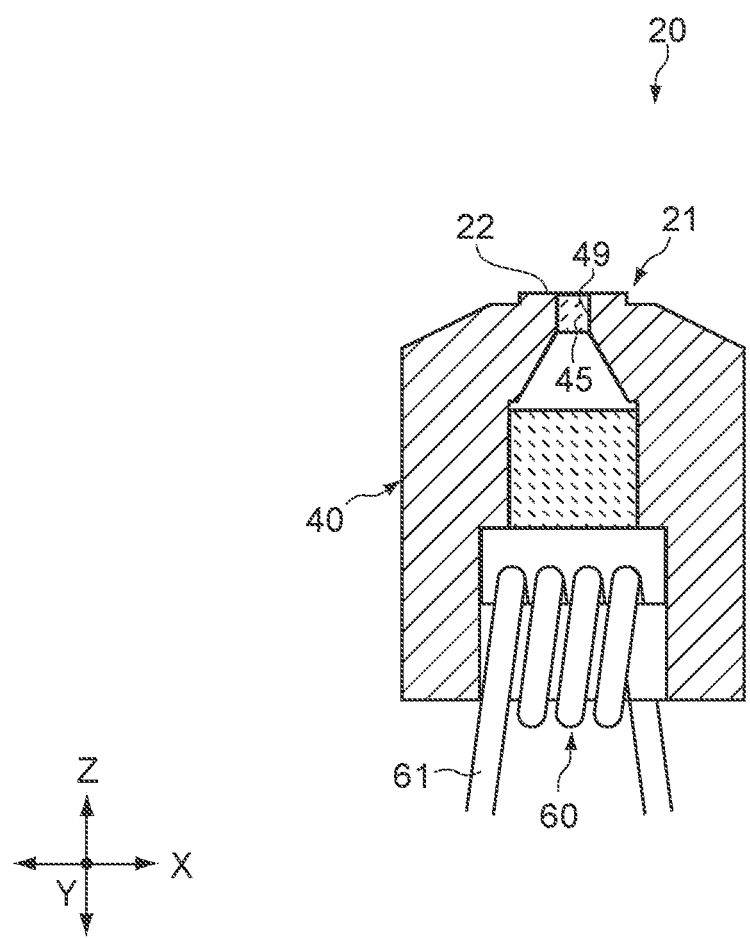
FIG. 16 is a cross-sectional view of the servo write head shown in FIG. 15 taken along an XZ plane.
Figure 17:
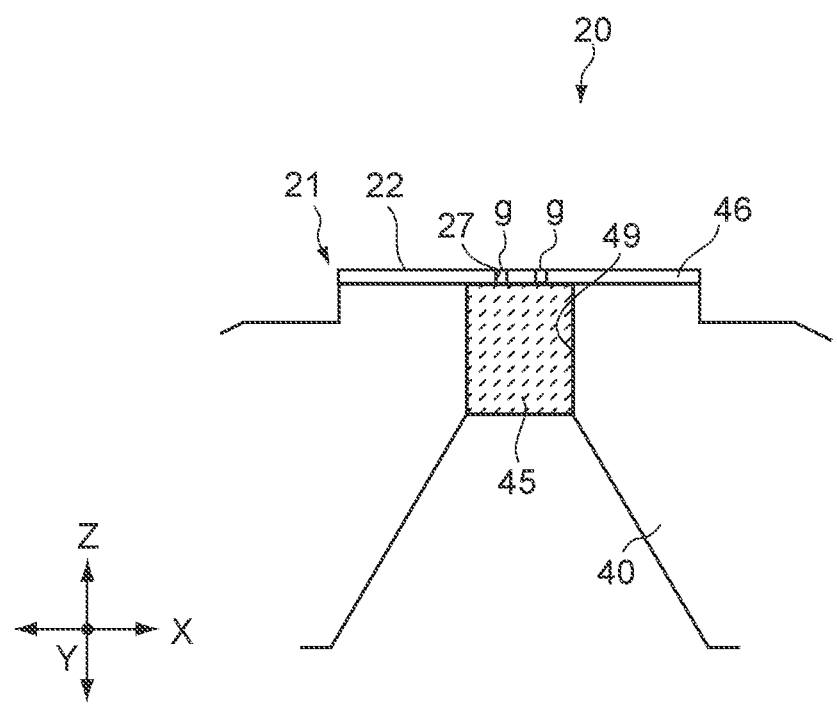
FIG. 17 is a schematic partial enlarged view of the upper part of the servo write head when viewed from the side.

Next, a specific configuration of the servo write head 13 will be described. FIG. 15 is a perspective view of the servo write head 13 when viewed from the side of the magnetic tape 1. FIG. 16 is a cross-sectional view of the servo write head 13 shown in FIG. 15 taken along the XZ plane. FIG. 17 is a schematic partial enlarged view of the upper part of the servo write head 13 when viewed from the side.

In the servo write head 13, the length direction (Y-axis direction) corresponds to the width direction of the magnetic tape 1, and the width direction (X-axis direction) corresponds to the length direction of the magnetic tape 1 and the travelling direction of the magnetic tape 1. Further, in the servo write head 13, the height direction (Z-axis direction) corresponds to the thickness direction of the magnetic tape 1.

As shown in these figures, the servo write head 13 includes a head block 20, a shield case 50, and a plurality of coils 60.

The shield case 50 shields the magnetic field generated from the coil 60 such that the magnetic field generated from the coil 60 included in the servo write head 13 does not adversely affect other external parts. Further, the shield case 50 shields the magnetic field generated from the outside such that the magnetic field generated from other external parts does not adversely affect the coil 60.

An opening 51 for exposing the head block 20 from the shield case 50 is provided in the upper part of the shield case 50. Further, in the lower part of the shield case 50, an opening for drawing out a lead wire 61 connected to the coil 60 to the outside of the shield case 50 is provided.

In the upper part of the head block 20, a facing portion 21 that faces the magnetic tape 1 is provided along the length direction (Y-axis direction) in the vicinity of the center in the width direction (X-axis direction). The surface of the facing portion 21 is a flat surface. In this specification, this surface of the facing portion 21 is referred to as a recording surface 22. This recording surface 22 faces the travelling magnetic tape 1 and records the servo pattern 6 on the magnetic tape 1 by a magnetic gap g that is provided in the recording surface 22.

The head block 20 includes a core portion 40 that is a core of the head block 20, a base portion 45 that is a base where the magnetic gap g is formed, and a thin film portion 46 forming a surface of the facing portion 21 (see particularly FIG. 16 and FIG. 17). The thin film portion 46 is a metal magnetic film. Note that the recording surface 22 described above actually corresponds to a surface of the thin film portion 46.

In the vicinity of the center of the upper part of the core portion 40 in the width direction (X-axis direction), an opening 49 that vertically penetrates the core portion 40 along the length direction (Y-axis direction) is formed. The base portion 45 is disposed in this opening 49 so as to fill the opening 49 formed on the upper part of the core portion 40.

As the material of the base portion 45, a hard non-magnetic material (various glass materials, various ceramic materials) having a high melting point is used in consideration of various types of bonding during the production of the head block 20 and heat treatment performed for achieving the magnetic properties of the thin film portion 46.

The thin film portion 46 is provided over the entire region of the facing portion 21. The thin film portion 46 is formed of, for example, Fe-based microcrystal, NiFe, or another soft magnetic alloy having high saturation magnetic flux density similar thereto. Further, the thickness of the thin film portion 46 is several μm.

An opening 27 having a shape corresponding to the magnetic gap g is provided in the thin film portion 46 at a position corresponding to the magnetic gap g. This opening 27 is provided in the thin film portion 46 so as to vertically penetrate the thin film portion 46. A non-magnetic material is embedded in this opening 27, the upper surface of this non-magnetic material has the same height as that of the surface (recording surface 22) of the thin film portion 46, and the lower surface of the non-magnetic material is connected to the upper surface of the base portion 45. This non-magnetic material embedded in the thin film portion 46 forms the magnetic gap g.

When the core portion 40 is excited by the coil 60, the non-magnetic material (magnetic gap g) embedded in the thin film portion 46 prevents the magnetic flux from passing through the thin film portion 46, and thus, a leakage magnetic field is generated at the position of the magnetic gap g. This leakage magnetic field makes it possible to write the servo pattern 6 on the servo band s.

The core portion 40 includes the plurality of head blocks h0 to h4. The plurality of head blocks h0 to h4 is formed of a magnetic material. As the magnetic material, for example, a ferrite material such as single crystalline ferrite and polycrystalline ferrite, or a soft magnetic alloy material such as sendust. Examples of the ferrite material include Mn—Zn ferrite.

The individual lead wires 61 are wound around in a coil shape below the five head blocks h0 to h4, and the individual coil 60 is formed for each of the head blocks h0 to h4.

Individual pulse signals can be supplied to the five coils 60, and the five head blocks h0 to h4 can be individually excited. As a result, the five head blocks h0 to h4 are capable of writing the servo pattern 6 on the servo band s at different timings.

[Conclusion]

As described above, in accordance with this embodiment, the combinations of the servo patterns 6 to be recorded in the respective servo bands s0 to s12 and the phases P1 and P2 are all different. As a result, the magnetic tape 1 according to this embodiment is configured such that the data band d can be specified on the basis of the difference of the combination of the data band d can be specified on the basis of the difference in the combination of the servo band identification information and the phase P of the pair of servo bands s sandwiching the data band d. As a result, an increase in servo band identification information due to an increase in number of data bands can be suppressed and an increase in number of data bands can be easily coped with. Further, since it is unnecessary to add unique servo band identification information to individual servo bands, an increase in types of servo band identification information can be suppressed and assignment of the servo band identification information to each servo band can be easily performed. For this reason, an increase in number of servo bands due to an increase in number of data bands can be sufficiently coped with. Further, in the case of 13 ch, since two types of phases are sufficient, it is possible to detects the servo pattern 6 on each of the servo bands s0 to s12 with high accuracy while minimizing the influence of the phase difference of PES.

Further, since the width of the individual data band can be narrowed by increasing the number of servo bands, the shape change of the magnetic tape 1 due to changes in the temperature and humidity environment or the like is suppressed. As a result, it is possible to reliably read or write data for a long time.

Further, in accordance with this embodiment, since a plurality of types of servo frames SF1 and SF0 is formed by making some of the arrangement intervals of the inclined portions in the servo sub-frame SSF1 different, it is possible to appropriately acquire servo band identification information corresponding to each servo band without interfering tracking control.

Further, in accordance with this embodiment, since the number of types of servo band identification information can be less than half the number of servo bands, it is possible to simplify the recorded information and thus reduce the amount memory used for writing and reading information regarding the servo band.

Further, in order to achieve high recording density, small magnetic particles having high magnetic properties are used, but it is necessary to apply a large current to the recording head in order to record a servo signal in the magnetic layer using such magnetic powder. It is necessary to use a thick coil wire and increase the number of turns in order to apply a large current, so that it is important to collectively reduce the number of coils in the servo band as much as possible to make it possible to apply a large current. In this embodiment, since one coil is used to record servo bands in three or more continuous servo bands at the same timing with different phases, the number of coils can be reduced.

Specifically, by making the number of head blocks at most six per ½ inch (length of the width of the tape-like magnetic recording medium) and enabling one coil to write three or more tracks per one head block, a servo write head capable of writing 10 or more servo bands can be realized.

By using both the methods of writing servo band identification information in the form of a signal in the servo signal and shifting the recording position in the longitudinal direction to change the phase, a servo write head capable of writing 10 or more servo bands at the same timing can be created. It is possible to reliably specify the positions of even 10 or more data bands.

With the need to increase the recording density in the current linear serpentine tape system, improving the track density has become an important issue. For example, in LTO, in the case where the cartridge capacity has the recording density exceeding 30 TB, the following specifications can be realized in accordance with this embodiment.

Linear recording density: 580 kfci or more
Track density: 25 ktpi or more
Tape total thickness: 5.1 um or less
Bit volume: 3600000 cubic nm or less Modified Example Although the embodiments of the present technology and modified examples have been described above, the present technology is not limited to only the above-mentioned embodiments and it goes without saying that various modification can be made without departing from the essence of the present technology.

For example, the azimuthal slope (azimuth angle) of the servo frame SF forming the servo pattern 6 can be, for example, 11° or more and 36° or less, and favorably 11° or more and 26° or less. Further, although the azimuthal slopes have been of two types, "/" and "Ɏ", an azimuthal slope with an inclination angle different therefrom may further be included in the servo pattern.

In the embodiment described above, although the magnetic tape conforming to the LTO standard has been exemplified as a tape-like magnetic recording medium, the present technology can also be applied to a magnetic tape of another standard, similarly.

In the embodiment described above, each of the head blocks h0 to h4 is typically one head block in which three magnetic gaps g are formed. Alternatively, each of the head blocks h0 to h4 may be created by bonding three divided head blocks (not shown) in which three magnetic gaps g are formed. In this case, the three divided head blocks that are bonded are wound with a common coil, and the three divided head blocks are magnetized at the same timing by the induced magnetic field from the coil.

Further, one head block in which four magnetic gaps g are formed may be created by bonding two divided head blocks (not shown) each including two magnetic gaps g. In this case, the two divided head blocks that are bonded may be individually wound with coils and the four divided head blocks may be magnetized at different timings by the induced magnetic field from the coils. As a result, for example, in the case of 13 ch, the servo bands may be AAAABBBBAACCB, AAAABBBBCCBBA, or the like unlike FIG. 10A and FIG. 10B instead of AAAABBBBCCBBA from the top in the figure.

The present disclosure may have the following configurations.

(1) A servo pattern recording method of recording a servo pattern along a longitudinal direction of a tape-like magnetic recording medium, including:

determining a first servo band group that includes three or more first servo bands for recording a first servo pattern in which first servo band identification information having a plurality of bits is to be embedded, and a second servo band group that includes three or more second servo bands for recording a second servo pattern in which second servo band identification information having a plurality of bits is to be embedded, the second servo band identification information being different from the first servo band identification information; and recording the first servo band identification information on the first servo band group and the second servo band identification information on the second servo band group such that a combination of a first pair and a second pair is not duplicated between two servo bands adjacent to each other, the first pair being a pair of servo band identification information and a phase thereof in the longitudinal direction in one of the two servo bands read by a first servo read head, the second pair being a pair of servo band identification information and a phase thereof in the longitudinal direction in the other servo band read by a second servo read head.

(2) The servo pattern recording method according to (1) above, in which the first servo band group includes three or more continuous first servo bands, and the second servo band group includes three or more continuous second servo bands.

(3) The servo pattern recording method according to (1) or (2) above, further including
 determining a third servo band group that includes three or more third servo bands for recording a third servo pattern in which third servo band identification information having a plurality of bits is to be embedded, the third servo band identification information being different from the first servo band identification information and the second servo band identification information.

(4) The servo pattern recording method according to (3) above, in which
 the third servo band group includes three or more continuous third servo bands.

(5) The servo pattern recording method according to (3) or (4) above, further including
 determining a fourth servo band group that includes three or more fourth servo bands for recording a fourth servo pattern in which fourth servo band identification information having a plurality of bits is to be embedded, the fourth servo band identification information being different from the first servo band identification information, the second servo band identification information, and the third servo band identification information.

(6) The servo pattern recording method according to (5) above, in which
 the fourth servo band group includes three or more continuous fourth servo bands.

(7) A servo pattern recording apparatus that records a servo pattern along a longitudinal direction of a tape-like magnetic recording medium, including:
 a servo write head that includes
  a first head block that includes three or more first magnetic gaps arranged corresponding to three or more continuous first servo bands, the three or more first magnetic gaps being arranged such that combinations of phases in the longitudinal direction of two adjacent first magnetic gaps included in the three or more first magnetic gaps are all different, and
  a second head block that includes three or more second magnetic gaps arranged corresponding to three or more continuous second servo bands, the three or more second magnetic gaps being arranged such that combinations of phases in the longitudinal direction of two adjacent second magnetic gaps included in the three or more second magnetic gaps are all different; and
 a drive unit that outputs, at same timing, a first recording signal for recording first servo band identification information having a plurality of bits to the first head block and a second recording signal for recording second servo band identification information having a plurality of bits to the second head block, the second servo band identification information being different from the first servo band identification information.

(8) The servo pattern recording apparatus according to (7) above, in which
 the servo write head further includes a third head block that includes three or more third magnetic gaps arranged corresponding to three or more continuous third servo bands, the three or more third magnetic gaps being arranged such that combinations of phases in the longitudinal direction of two adjacent third magnetic gaps included in the three or more third magnetic gaps are all different, and
 the drive unit outputs, at the same timing, a third recording signal for recording third servo band identification information having a plurality of bits to the third head block, the third servo band identification information being different from the first servo band identification information and the second servo band identification information.

(9) The servo pattern recording apparatus according to (8) above, in which
 the servo write head further includes a different first head block that is not adjacent to the first head block, the different first head block includes one or two or more first magnetic gaps arranged corresponding to one or two or more continuous first servo bands, and combinations of two adjacent head blocks of the first head block, the second head block, the third head block, and the different first head block are all different, and
 the drive unit outputs, at the same timing, the first recording signal to the different first head block.

(10) The servo pattern recording apparatus according to (7) above, in which
 the first magnetic gap is capable of recording, as the first servo band identification information, a plurality of servo frames that includes two or more different types of azimuthal slopes and encodes the first servo band identification information on the servo bands,
 the second magnetic gap is capable of recording, as the second servo band identification information, a plurality of servo frames that includes two or more different types of azimuthal slopes and encodes the second servo band identification information on the servo bands, and
 the drive unit outputs the first recording signal and the second recording signal at pulse rise times different from each other in accordance with a difference between the first servo band identification information and the second servo band identification information.

(11) The servo pattern recording apparatus according to (8) above, in which
 the first magnetic gap is capable of recording, as the first servo band identification information, a plurality of servo frames that includes two or more different types of azimuthal slopes and encodes the first servo band identification information on the servo bands,
 the second magnetic gap is capable of recording, as the second servo band identification information, a plurality of servo frames that includes two or more different types of azimuthal slopes and encodes the second servo band identification information on the servo bands,
 the third magnetic gap is capable of recording, as the third servo band identification information, a plurality of servo frames that includes two or more different types of azimuthal slopes and encodes the third servo band identification information on the servo bands, and
 the drive unit outputs the first recording signal, the second recording signal, and the third recording signal at pulse rise times different from each other in accordance with differences between the first servo band identification information, the second servo band identification information, and the third servo band identification information.

(12) The servo pattern recording apparatus according to (7) above, in which
 the first head block is one head block in which the three or more first magnetic gaps are formed, and
 the second head block is one head block in which the three or more second magnetic gaps are formed.

(13) The servo pattern recording apparatus according to (7) above, in which
  the first head block is obtained by bonding three or more first divided head blocks in which the three or more first magnetic gaps are formed, and
  the second head block is obtained by bonding three or more second divided head blocks in which the three or more second magnetic gaps are formed.

(14) A method of producing a tape-like magnetic recording medium that includes a magnetic layer including six or more servo bands extending in a longitudinal direction, including:
  determining a first servo band group that includes three or more first servo bands for recording a first servo pattern in which first servo band identification information having a plurality of bits is to be embedded, and a second servo band group that includes three or more second servo bands for recording a second servo pattern in which second servo band identification information having a plurality of bits is to be embedded, the second servo band identification information being different from the first servo band identification information; and
  recording the first servo band identification information on the first servo band group and the second servo band identification information on the second servo band group such that a combination of a first pair and a second pair is not duplicated between two servo bands adjacent to each other, the first pair being a pair of servo band identification information and a phase thereof in the longitudinal direction in one of the two servo bands read by a first servo read head, the second pair being a pair of servo band identification information and a phase thereof in the longitudinal direction in the other servo band read by a second servo read head.

(15) A tape-like magnetic recording medium, including:
  a magnetic layer that includes a plurality of servo bands extending in a longitudinal direction,
  the magnetic layer including
    a first servo band group that includes three or more first servo bands, a first servo pattern being recorded on the three or more first servo bands, first servo band identification information having a plurality of bits being to be embedded in the first servo pattern, and
    a second servo band group that includes three or more second servo bands, a second servo pattern being recorded on the three or more second servo bands, second servo band identification information having a plurality of bits being to be embedded in the second servo pattern, the second servo band identification information being different from the first servo band identification information,
  combinations of a first pair and a second pair being all different between two servo bands adjacent to each other, the first pair being a pair of servo band identification information and a phase thereof in the longitudinal direction in one of the two servo bands read by a first servo read head, the second pair being a pair of servo band identification information and a phase thereof in the longitudinal direction in the other servo band read by a second servo read head.

(16) The tape-like magnetic recording medium according to (15) above, in which
  the first servo band group includes three or more continuous first servo bands, and
  the second servo band group includes three or more continuous second servo bands.

(17) The tape-like magnetic recording medium according to (15) or (16) above, in which
  the magnetic layer further includes a third servo band group that includes three or more third servo bands, a third servo pattern being recorded on the three or more third servo bands, third servo band identification information having a plurality of bits being to be embedded in the third servo pattern, the third servo band identification information being different from the first servo band identification information and the second servo band identification information.

(18) The tape-like magnetic recording medium according to (17) above, in which
  the third servo band group includes three or more continuous third servo bands.

(19) The tape-like magnetic recording medium according to (17) or (18) above, in which
  the magnetic layer further includes a fourth servo band group that includes three or more fourth servo bands, a fourth servo pattern being recorded on the three or more fourth servo bands, fourth servo band identification information having a plurality of bits being to be embedded in the fourth servo pattern, the fourth servo band identification information being different from the first servo band identification information, the second servo band identification information, and the third servo band identification information.

(20) The tape-like magnetic recording medium according to (19) above, in which
  the fourth servo band group includes three or more continuous fourth servo bands.

(21) The tape-like magnetic recording medium according to any one of (15) to (20) above, in which
  the first servo band identification information includes a plurality of servo frames that includes two or more different types of azimuthal slopes and encodes the first servo band identification information,
  the second servo band identification information includes a plurality of servo frames that includes two or more different types of azimuthal slopes and encodes the second servo band identification information, and
  as the plurality of servo frames that encodes the first servo band identification information and the servo frames that encode the second servo band identification information are compared to each other, some of arrangement intervals of at least one of the two or more different types of azimuthal slopes are different from each other.

(22) The tape-like magnetic recording medium according to (17) above, in which
  the first servo band identification information includes a plurality of servo frames that includes two or more different types of azimuthal slopes and encodes the first servo band identification information,
  the second servo band identification information includes a plurality of servo frames that includes two or more different types of azimuthal slopes and encodes the second servo band identification information,
  the third servo band identification information includes a plurality of servo frames that includes two or more different types of azimuthal slopes and encodes the third servo band identification information, and
  as the plurality of servo frames that encodes the first servo band identification information, the servo frames that encode the second servo band identification information, and the plurality of servo frames that encodes the third servo band identification information are compared to each other, some of arrangement intervals of at least one of the two or more different types of azimuthal slopes are different from each other.

(23) The tape-like magnetic recording medium according to any one of (15) to (22) above, further including
a base material;
an underlayer that is provided between one main surface of the base material and the magnetic layer; and
a back layer that is provided on the other main surface of the base material.

(24) A servo write head to be used for recording a servo pattern along a longitudinal direction of a tape-like magnetic recording medium, including
a first head block that includes three or more first magnetic gaps arranged corresponding to three or more continuous first servo bands, the three or more first magnetic gaps being arranged such that combinations of phases in the longitudinal direction of two adjacent first magnetic gaps included in the three or more first magnetic gaps are all different; and
a second head block that includes three or more second magnetic gaps arranged corresponding to three or more continuous second servo bands, the three or more second magnetic gaps being arranged such that combinations of phases in the longitudinal direction of two adjacent second magnetic gaps included in the three or more second magnetic gaps are all different,
a first recording signal for recording first servo band identification information having a plurality of bits and a second recording signal for recording second servo band identification information having a plurality of bits being output at same timing to the first head block and the second head block, respectively, the second servo band identification information being different from the first servo band identification information.

REFERENCE SIGNS LIST 1 magnetic tape
4 magnetic layer
6 servo pattern
13 servo write head
20 drive unit
30 controller
61 first servo pattern
62 second servo pattern
100 servo pattern recording apparatus
d0 to d11 data band
s0 to s12 servo band
SF, SF1, SF0 servo frame

The invention claimed is:

1. A servo pattern recording method of recording a servo pattern along a longitudinal direction of a tape-like magnetic recording medium, comprising:
determining a first servo band group that includes three or more first servo bands for recording a first servo pattern in which first servo band identification information having a plurality of bits is to be embedded, and a second servo band group that includes three or more second servo bands for recording a second servo pattern in which second servo band identification information having a plurality of bits is to be embedded, the second servo band identification information being different from the first servo band identification information; and
recording the first servo band identification information on the first servo band group and the second servo band identification information on the second servo band group such that a combination of a first pair and a second pair is not duplicated between two servo bands adjacent to each other, the first pair being a pair of servo band identification information and a phase thereof in the longitudinal direction in one of the two servo bands read by a first servo read head, the second pair being a pair of servo band identification information and a phase thereof in the longitudinal direction in the other servo band read by a second servo read head.

2. The servo pattern recording method according to claim 1, wherein
the first servo band group includes three or more continuous first servo bands, and
the second servo band group includes three or more continuous second servo bands.

3. The servo pattern recording method according to claim 1, further comprising
determining a third servo band group that includes three or more third servo bands for recording a third servo pattern in which third servo band identification information having a plurality of bits is to be embedded, the third servo band identification information being different from the first servo band identification information and the second servo band identification information.

4. The servo pattern recording method according to claim 3, wherein
the third servo band group includes three or more continuous third servo bands.

5. The servo pattern recording method according to claim 3, further comprising
determining a fourth servo band group that includes three or more fourth servo bands for recording a fourth servo pattern in which fourth servo band identification information having a plurality of bits is to be embedded, the fourth servo band identification information being different from the first servo band identification information, the second servo band identification information, and the third servo band identification information.

6. The servo pattern recording method according to claim 5, wherein
the fourth servo band group includes three or more continuous fourth servo bands.

7. A servo pattern recording apparatus that records a servo pattern along a longitudinal direction of a tape-like magnetic recording medium, comprising:
a servo write head that includes
a first head block that includes three or more first magnetic gaps arranged corresponding to three or more continuous first servo bands, the three or more first magnetic gaps being arranged such that combinations of phases in the longitudinal direction of two adjacent first magnetic gaps included in the three or more first magnetic gaps are all different, and
a second head block that includes three or more second magnetic gaps arranged corresponding to three or more continuous second servo bands, the three or more second magnetic gaps being arranged such that combinations of phases in the longitudinal direction of two adjacent second magnetic gaps included in the three or more second magnetic gaps are all different; and
a drive unit that outputs, at same timing, a first recording signal for recording first servo band identification information having a plurality of bits to the first head block and a second recording signal for recording second servo band identification information having a plurality of bits to the second head block, the second servo band identification information being different from the first servo band identification information.

8. The servo pattern recording apparatus according to claim 7, wherein
the servo write head further includes a third head block that includes three or more third magnetic gaps arranged corresponding to three or more continuous third servo bands, the three or more third magnetic gaps being arranged such that combinations of phases in the longitudinal direction of two adjacent third magnetic gaps included in the three or more third magnetic gaps are all different, and
the drive unit outputs, at the same timing, a third recording signal for recording third servo band identification information having a plurality of bits to the third head block, the third servo band identification information being different from the first servo band identification information and the second servo band identification information.

9. The servo pattern recording apparatus according to claim 8, wherein
the servo write head further includes a different first head block that is not adjacent to the first head block, the different first head block includes one or two or more first magnetic gaps arranged corresponding to one or two or more continuous first servo bands, and combinations of two adjacent head blocks of the first head block, the second head block, the third head block, and the different first head block are all different, and
the drive unit outputs, at the same timing, the first recording signal to the different first head block.

10. The servo pattern recording apparatus according to claim 7, wherein
the first magnetic gap is capable of recording, as the first servo band identification information, a plurality of servo frames that includes two or more different types of azimuthal slopes and encodes the first servo band identification information on the servo bands,
the second magnetic gap is capable of recording, as the second servo band identification information, a plurality of servo frames that includes two or more different types of azimuthal slopes and encodes the second servo band identification information on the servo bands, and
the drive unit outputs the first recording signal and the second recording signal at pulse rise times different from each other in accordance with a difference between the first servo band identification information and the second servo band identification information.

11. The servo pattern recording apparatus according to claim 8, wherein
the first magnetic gap is capable of recording, as the first servo band identification information, a plurality of servo frames that includes two or more different types of azimuthal slopes and encodes the first servo band identification information on the servo bands,
the second magnetic gap is capable of recording, as the second servo band identification information, a plurality of servo frames that includes two or more different types of azimuthal slopes and encodes the second servo band identification information on the servo bands,
the third magnetic gap is capable of recording, as the third servo band identification information, a plurality of servo frames that includes two or more different types of azimuthal slopes and encodes the third servo band identification information on the servo bands, and the drive unit outputs the first recording signal, the second recording signal, and the third recording signal at pulse rise times different from each other in accordance with differences between the first servo band identification information, the second servo band identification information, and the third servo band identification information.

12. The servo pattern recording apparatus according to claim 7, wherein
the first head block is one head block in which the three or more first magnetic gaps are formed, and
the second head block is one head block in which the three or more second magnetic gaps are formed.

13. The servo pattern recording apparatus according to claim 7, wherein
the first head block is obtained by bonding three or more first divided head blocks in which the three or more first magnetic gaps are formed, and
the second head block is obtained by bonding three or more second divided head blocks in which the three or more second magnetic gaps are formed.

14. A method of producing a tape-like magnetic recording medium that includes a magnetic layer including six or more servo bands extending in a longitudinal direction, comprising:
determining a first servo band group that includes three or more first servo bands for recording a first servo pattern in which first servo band identification information having a plurality of bits is to be embedded, and a second servo band group that includes three or more second servo bands for recording a second servo pattern in which second servo band identification information having a plurality of bits is to be embedded, the second servo band identification information being different from the first servo band identification information; and
recording the first servo band identification information on the first servo band group and the second servo band identification information on the second servo band group such that a combination of a first pair and a second pair is not duplicated between two servo bands adjacent to each other, the first pair being a pair of servo band identification information and a phase thereof in the longitudinal direction in one of the two servo bands read by a first servo read head, the second pair being a pair of servo band identification information and a phase thereof in the longitudinal direction in the other servo band read by a second servo read head.

15. A tape-like magnetic recording medium, comprising:
a magnetic layer that includes a plurality of servo bands extending in a longitudinal direction,
the magnetic layer including
a first servo band group that includes three or more first servo bands, a first servo pattern being recorded on the three or more first servo bands, first servo band identification information having a plurality of bits being to be embedded in the first servo pattern, and
a second servo band group that includes three or more second servo bands, a second servo pattern being recorded on the three or more second servo bands, second servo band identification information having a plurality of bits being to be embedded in the second servo pattern, the second servo band identification information being different from the first servo band identification information,
combinations of a first pair and a second pair being all different between two servo bands adjacent to each other, the first pair being a pair of servo band identification information and a phase thereof in the longitudinal direction in one of the two servo bands read by a first servo read head, the second pair being a pair of servo band identification information and a phase thereof in the longitudinal direction in the other servo band read by a second servo read head.

16. The tape-like magnetic recording medium according to claim 15, wherein
the first servo band group includes three or more continuous first servo bands, and
the second servo band group includes three or more continuous second servo bands.

17. The tape-like magnetic recording medium according to claim 15, wherein
the magnetic layer further includes a third servo band group that includes three or more third servo bands, a third servo pattern being recorded on the three or more third servo bands, third servo band identification information having a plurality of bits being to be embedded in the third servo pattern, the third servo band identification information being different from the first servo band identification information and the second servo band identification information.

18. The tape-like magnetic recording medium according to claim 17, wherein
the third servo band group includes three or more continuous third servo bands.

19. The tape-like magnetic recording medium according to claim 17, wherein
the magnetic layer further includes a fourth servo band group that includes three or more fourth servo bands, a fourth servo pattern being recorded on the three or more fourth servo bands, fourth servo band identification information having a plurality of bits being to be embedded in the fourth servo pattern, the fourth servo band identification information being different from the first servo band identification information, the second servo band identification information, and the third servo band identification information.

20. The tape-like magnetic recording medium according to claim 19, wherein
the fourth servo band group includes three or more continuous fourth servo bands.

21. The tape-like magnetic recording medium according to claim 15, wherein
the first servo band identification information includes a plurality of servo frames that includes two or more different types of azimuthal slopes and encodes the first servo band identification information,
the second servo band identification information includes a plurality of servo frames that includes two or more different types of azimuthal slopes and encodes the second servo band identification information, and
as the plurality of servo frames that encodes the first servo band identification information and the servo frames that encode the second servo band identification information are compared to each other, some of arrangement intervals of at least one of the two or more different types of azimuthal slopes are different from each other.

22. The tape-like magnetic recording medium according to claim 17, wherein
the first servo band identification information includes a plurality of servo frames that includes two or more different types of azimuthal slopes and encodes the first servo band identification information,
the second servo band identification information includes a plurality of servo frames that includes two or more different types of azimuthal slopes and encodes the second servo band identification information,
the third servo band identification information includes a plurality of servo frames that includes two or more different types of azimuthal slopes and encodes the third servo band identification information, and
as the plurality of servo frames that encodes the first servo band identification information, the servo frames that encode the second servo band identification information, and the plurality of servo frames that encodes the third servo band identification information are compared to each other, some of arrangement intervals of at least one of the two or more different types of azimuthal slopes are different from each other.

23. The tape-like magnetic recording medium according to claim 15, further comprising
a base material;
an underlayer that is provided between one main surface of the base material and the magnetic layer; and
a back layer that is provided on the other main surface of the base material.

24. A servo write head to be used for recording a servo pattern along a longitudinal direction of a tape-like magnetic recording medium, comprising
a first head block that includes three or more first magnetic gaps arranged corresponding to three or more continuous first servo bands, the three or more first magnetic gaps being arranged such that combinations of phases in the longitudinal direction of two adjacent first magnetic gaps included in the three or more first magnetic gaps are all different; and
a second head block that includes three or more second magnetic gaps arranged corresponding to three or more continuous second servo bands, the three or more second magnetic gaps being arranged such that combinations of phases in the longitudinal direction of two adjacent second magnetic gaps included in the three or more second magnetic gaps are all different,
a first recording signal for recording first servo band identification information having a plurality of bits and a second recording signal for recording second servo band identification information having a plurality of bits being output at same timing to the first head block and the second head block, respectively, the second servo band identification information being different from the first servo band identification information.

* * * * *